(12) United States Patent
Lee et al.

(10) Patent No.: US 12,467,194 B2
(45) Date of Patent: Nov. 11, 2025

(54) LAUNDRY DRYING MACHINE

(71) Applicant: LG Electronics Inc., Seoul (KR)

(72) Inventors: Junghoon Lee, Seoul (KR); Chanwoo Moon, Seoul (KR); Jihoon Kim, Seoul (KR); Youngmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1007 days.

(21) Appl. No.: 17/546,747

(22) Filed: Dec. 9, 2021

(65) Prior Publication Data

US 2022/0195658 A1    Jun. 23, 2022

(30) Foreign Application Priority Data

Dec. 18, 2020    (KR) .................. 10-2020-0178832

(51) Int. Cl.
*D06F 58/26* (2006.01)
*D06F 58/08* (2006.01)

(52) U.S. Cl.
CPC .............. *D06F 58/26* (2013.01); *D06F 58/08* (2013.01)

(58) Field of Classification Search
CPC .......... D06F 58/26; D06F 58/08; D06F 58/04; D06F 58/266; D06F 58/10; H05B 6/6467; H05B 6/80
See application file for complete search history.

(56) References Cited

U.S. PATENT DOCUMENTS

| | | | |
|---|---|---|---|
| 3,605,041 A * | 9/1971 | Judkins | H01P 1/00 333/260 |
| 4,057,907 A | 11/1977 | Rapino et al. | |
| 4,356,640 A * | 11/1982 | Jansson | D06F 58/266 34/261 |
| 4,510,361 A | 4/1985 | Mahan | |
| 4,765,066 A * | 8/1988 | Yoon | H05B 6/80 34/68 |
| 9,127,400 B2 | 9/2015 | Herman et al. | |

FOREIGN PATENT DOCUMENTS

| | | |
|---|---|---|
| EP | 3073008 | 9/2016 |
| JP | 2020062210 | 4/2020 |
| KR | 20-0090976 | 10/1995 |
| KR | 10-0212673 | 8/1999 |
| KR | 10-0313999 | 12/2001 |
| KR | 20150123637 A * | 11/2015 |
| WO | WO2004059071 | 7/2004 |
| WO | WO-2016040966 A1 * | 3/2016 ............. D06F 23/00 |

OTHER PUBLICATIONS

Translation, KR-20150123637-A (Year: 2015).*
Extended European Search Report in European Appln. No. 21212675.9, dated May 16, 2022, 6 pages.

* cited by examiner

*Primary Examiner* — Jessica Yuen
(74) *Attorney, Agent, or Firm* — Fish & Richardson P.C.

(57) ABSTRACT

A laundry drying machine includes a cabinet, a drum that is rotatably disposed inside the cabinet and that defines an inner space configured to accommodate a subject to be dried, a driver configured to rotate the drum, a duct configured to supply air to the drum and to discharge the air from the drum, and an electrode part configured to form an electric field in the inner space of the drum to thereby heat the subject. The electrode part includes a probe configured to radiate an electromagnetic wave defining the electric field, where at least a portion of the probe is disposed in the inner space of the drum.

20 Claims, 13 Drawing Sheets

LAUNDRY DRYING MACHINE

CROSS-REFERENCE TO RELATED APPLICATIONS

This application claims the priority benefit of Korean Patent Application No. 10-2020-0178832, filed on Dec. 18, 2020, the disclosure of which is incorporated herein by reference.

TECHNICAL FIELD

The present disclosure relates to a laundry drying machine, and more particularly, to a laundry drying machine that is configured to heat and dry a subject to be dried by projecting RF electromagnetic wave onto the subject through a probe disposed on a central axis inside a drum.

BACKGROUND

A clothes treatment apparatus may perform a drying cycle for removing moisture from clothes. For example, the clothes treatment apparatus may supply hot air to a drum accommodating clothes to dry the clothes, thereby shortening the drying time of clothes, and sterilizing, and disinfecting the clothes in some cases.

In some cases, in the drying method of drying clothes using hot air, higher heat may be locally applied to the surface in contact with the hot air, so that wrinkles may occur due to a difference in the drying speed. In some cases, the fabric may be damaged due to local overheating.

In some cases, a drying cycle may dry clothes using an electric field of high frequency (RF electromagnetic wave), instead of drying clothes by supplying hot air.

For example, a laundry drying machine may dry a subject to be dried by supplying microwave to the inside of a washing tub. In order to complement the hot air drying method, the laundry drying machine may include a magnetron for generating electromagnetic wave and a microwave radiation means for radiating the electromagnetic wave inside the washing tub to form an electric field in the inner space, so that the subject to be dried is dried by a dielectric heating method in which an electric field is applied to a dielectric material.

In some cases, in the drying method using electromagnetic wave, microwave may be radiated into the subject to be dried containing moisture, which may mitigate wrinkling due to the difference in the drying speed due. In some cases, washing and drying may be performed together in one washing tub in which an antenna may be frequently invaded. In some cases, the antenna may not be directly exposed to the inner space of the washing tub, and the resonant area of the subject to be dried may be narrow and the drying efficiency may be low.

In some cases, a laundry drying machine may dry the subject to be dried by supplying microwave to the inside of the washing tub. For example, the laundry drying machine may include a choke seal, which may shield the leakage of electromagnetic wave. In some cases, the choke seal may only block leakage of electromagnetic wave in the process of being transmitted from the magnetron to the antenna, and the antenna may be invaded. In some cases, the antenna may not be directly exposed to the inner space of the washing tub, and a tuner or matcher may continuously match the frequency of microwave to correspond to the resonance region of the subject to be dried.

In some examples, a clothes dryer may include an axial reflective rod disposed inside a drum. For example, the reflective rod may be disposed on a shaft inside the drum to evenly distribute the electromagnetic wave projected into the inner space of the drum, which may maintain the projection of the electromagnetic wave even when the drum rotates. In some cases, the electromagnetic wave may be radiated from one axis rather than the inside of the drum, and the electromagnetic wave may not be completely and evenly projected into the inner space of the drum despite the arrangement of the reflective rod. In some cases, as the subject to be dried flows by the rotation of the drum, the resonance region may be changed, and the dielectric heating efficiency may be lowered, which leads to a decrease of the drying efficiency and the power efficiency.

In some cases, a drying machine performs a method that dries the subject to be dried by forming an electric field inside a drum. For example, in order to complement the hot air drying method, the laundry drying machine may include two or more electrode parts serving as an anode and a cathode inside the drum to form an electric field in the inner space, and may dry the subject to be dried by the dielectric heating method in which an electric field is applied to a dielectric material. In some cases, in the drying method using dielectric heating, the drying efficiency could be increased by directly heating by radiating the RF electromagnetic wave into the moisture contained in the subject to be dried.

In some cases, local overheating may occur during a drying cycle, and in the process of rotating the drum to mix the subject to be dried, the arrangement of the electrode part serving as the anode and the cathode may be changed, and the projection of the electromagnetic wave may be stopped. In some cases, an electric field may be discontinuously formed in the inner space of the drum, resulting in a decrease in drying efficiency, and a spark may be generated in a motor during rotation. In some cases, the RF electromagnetic wave may not be evenly projected into the inner space of the drum, and local overheating may occur in the subject to be dried, thereby causing damage to the subject to be dried.

SUMMARY

The present disclosure describes a laundry drying machine capable of improving drying efficiency without a separate tuner by directly projecting electromagnetic wave into an inner space of a drum through a probe disposed inside the drum to enlarge a resonance area of a subject to be dried.

The present disclosure further describes a laundry drying machine capable of minimizing propagation loss and using the electromagnetic wave of higher output by transmitting the high-power radio frequency (RF) electromagnetic wave through a guide that performs a waveguide function.

The present disclosure further describes a laundry drying machine capable of helping to prevent local overheating by including an electrode part disposed on the central axis of a drum and uniformly radiating an electric field to the inner space of the drum.

The present disclosure further describes a laundry drying machine that performs a drying cycle without stopping the rotation of a drum by forming an electric field inside a drum through a single electrode part.

The present disclosure further describes a laundry drying machine that includes a probe cover for preventing a probe from being directly exposed to an inner space of a drum, so that the probe can be prevented from being damaged or dropped by the flow of a subject to be dried.

According to one aspect of the subject matter described in this application, a laundry drying machine includes a cabinet, a drum that is rotatably disposed inside the cabinet and that defines an inner space configured to accommodate a subject to be dried, a driver configured to rotate the drum, a duct configured to supply air to the drum and to discharge the air from the drum, and an electrode part configured to form an electric field in the inner space of the drum to thereby heat the subject. The electrode part includes a probe configured to radiate an electromagnetic wave defining the electric field, where at least a portion of the probe is disposed in the inner space of the drum.

Implementations according to this aspect can include one or more of the following features. For example, the probe can have a cylindrical shape and be disposed along a central axis of the drum. In some examples, the drum can define a coupling hole that receives at least a portion of the electrode part. The electrode part can further include an oscillator configured to generate the electromagnetic wave, a probe housing that is coupled to an outer circumferential surface of the coupling hole, and a connector configured to transmit the electromagnetic wave from the oscillator to the probe, where the connector has a first side connected to the probe housing and a second side connected to the oscillator. The probe can be configured to receive the electromagnetic wave from the connector. In some examples, the oscillator can be configured to output the electromagnetic wave having power that is less than or equal to 1 kW.

In some implementations, the probe can include a probe body that defines a probe space therein, where at least a portion of a first side of the probe body is closed, and an electrode pin that is disposed in the probe space of the probe body. In some examples, the probe body can further define a fixing hole at the first side of the probe body, and the electrode pin can be coupled to the fixing hole and fixed to the probe space of the probe body.

In some implementations, the probe can include a probe body that defines a probe space therein, where at least a portion of a first side of the probe body is closed, and a plurality of electrode pins that are disposed at an inner circumferential surface of the probe body and spaced apart from one another by a predetermined angle along a circumferential direction of the probe body. In some examples, the electrode part can further include a probe cover that is disposed at a rear inner surface of the drum and has a cylindrical shape, where the probe cover has a closed surface and an open surface that face each other.

In some examples, the probe cover can include a fixing pin that protrudes from a center of the closed surface toward the open surface, and the probe body can further define a fixing hole at the first side of the probe body, where the fixing hole receives the fixing pin. The probe cover and the probe body can be coaxially connected to each other by coupling of the fixing pin and the fixing hole.

According to another aspect, a laundry drying machine includes a cabinet, a drum that is rotatably disposed inside the cabinet and defines a coupling hole and an inner space that is configured to accommodate a subject to be dried, a driver configured to rotate the drum, a duct configured to supply air to the drum and to discharge the air from the drum, and an electrode part configured to form an electric field in the inner space of the drum to thereby heat the subject. The electrode part includes an oscillator configured to generate an electromagnetic wave defining the electric field, a probe disposed in the inner space of the drum through the coupling hole and configured to radiate the electromagnetic wave, a probe housing connected to the coupling hole from an outside of the drum, and a guide that defines a hollow waveguide configured to transmit the electromagnetic wave from the oscillator to the probe. The guide has a first side connected to the probe housing and a second side connected to the oscillator.

Implementations according to this aspect can include one or more of the following features. For example, the oscillator can be configured to output the electromagnetic wave having power that is greater than or equal to 1 kW and less than or equal to 2.5 kW. In some implementations, the guide can have a rectangular cross section and extends in one direction with respect to with respect to a rotation axis of the drum. For instance, the guide can extend in a left direction or a right direction with respect to a rotation axis of the drum.

In some implementations, the guide can define a connection hole at the first side of the guide, the connection hole having a circular shape. In some examples, the probe can be disposed on an axis of the connection hole, and at least a portion of the probe can be disposed in an inner space of the guide. In some examples, the probe can have an incident surface that has a hemispherical shape protruding toward the connection hole.

In some implementations, the electrode part can further include a probe support member that is disposed between the probe housing and the probe and fixes a position of the probe in the probe housing. In some examples, the probe support member can include an inner ring coupled to an outer circumferential surface of the probe, an outer ring coupled to an inner circumferential surface of the probe housing, and a plurality of support ribs that connect the inner ring to the outer ring and are arranged at regular intervals along a circumferential direction of the inner ring or the outer ring.

In some implementations, the electrode part can further include a plurality of probe support members that are disposed between the probe housing and the probe and fix a position of the probe in the probe housing, the plurality of probe support members being spaced apart from one another in an axial direction of the probe. In some implementations, the oscillator can be disposed at one side with respect to a rotational axis of the drum and spaced apart from the rotational axis of the drum by a predetermined distance.

In some implementations, the laundry drying machine can enlarge the resonance area of the subject to be dried and improve a drying efficiency without a separate tuner by disposing the probe inside the drum.

In some implementations, the guide is provided to transmit high-power RF electromagnetic wave, so that propagation loss can be minimized, and furthermore, the drying efficiency can be improved by using the electromagnetic wave of higher output.

In some implementations, the electrode part is disposed on the central axis of the drum, so that an electric field can be uniformly radiated to the inner space of the drum, and color transfer of the subject to be dried can be prevented.

In some implementations, the electrode part is configured as a single unit, and thus, the drying cycle can be performed without stopping the rotation of the drum, thereby improving operation efficiency and minimizing power consumption.

In some implementations, the probe cover is provided, and thus, there is an effect of preventing the probe from being damaged or dropped due to the movement of the subject to be dried during the drying process.

DETAILED DESCRIPTION

Hereinafter, one or more implementations of the present disclosure will be described in detail with reference to the accompanying drawings.

Hereinafter, the example configuration of a laundry drying machine 1 will be described with reference to FIGS. 1 to 4.

Figure 1:
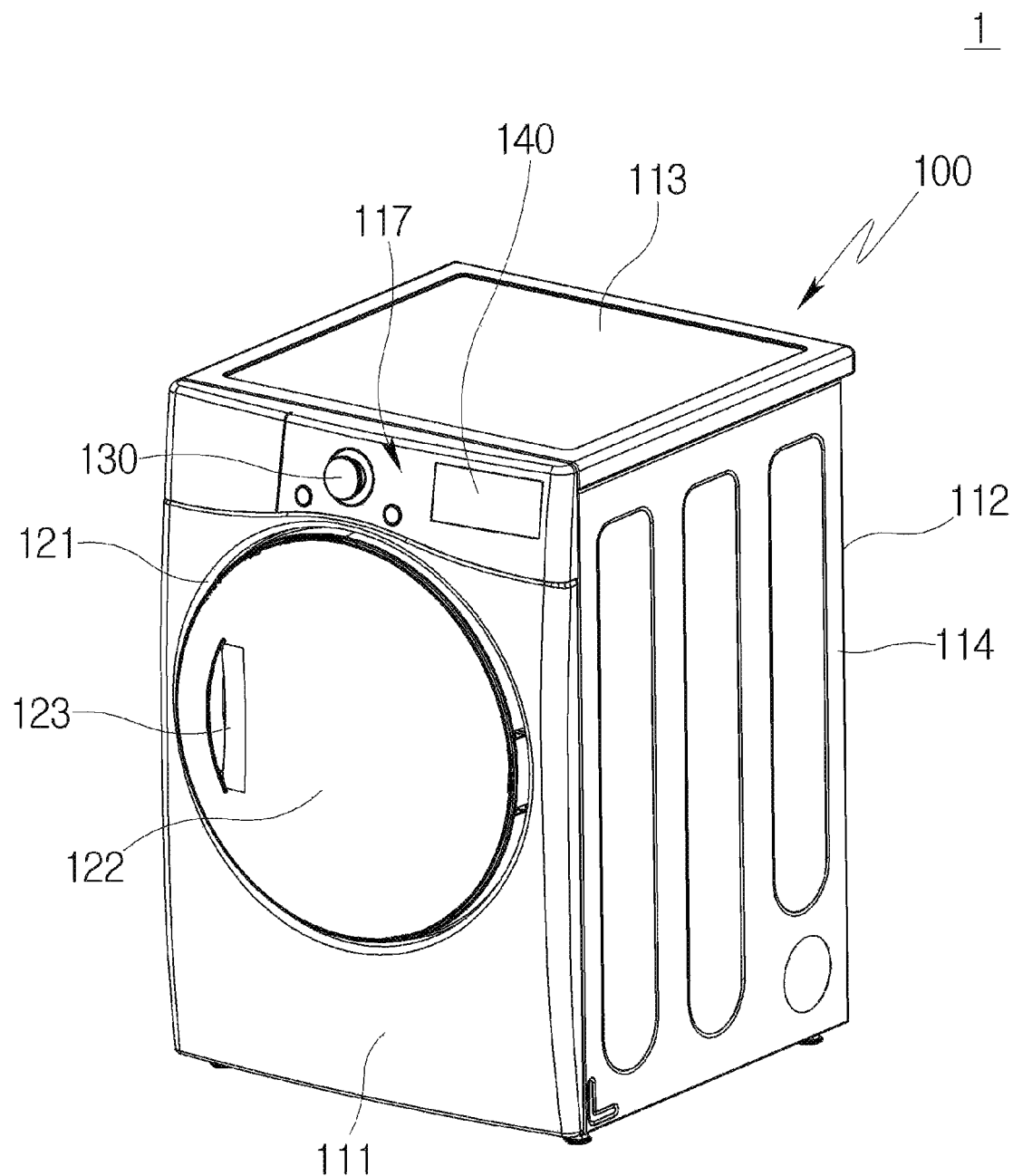
FIG. 1 is a view illustrating an external appearance of an example of a laundry drying machine.
Figure 2:
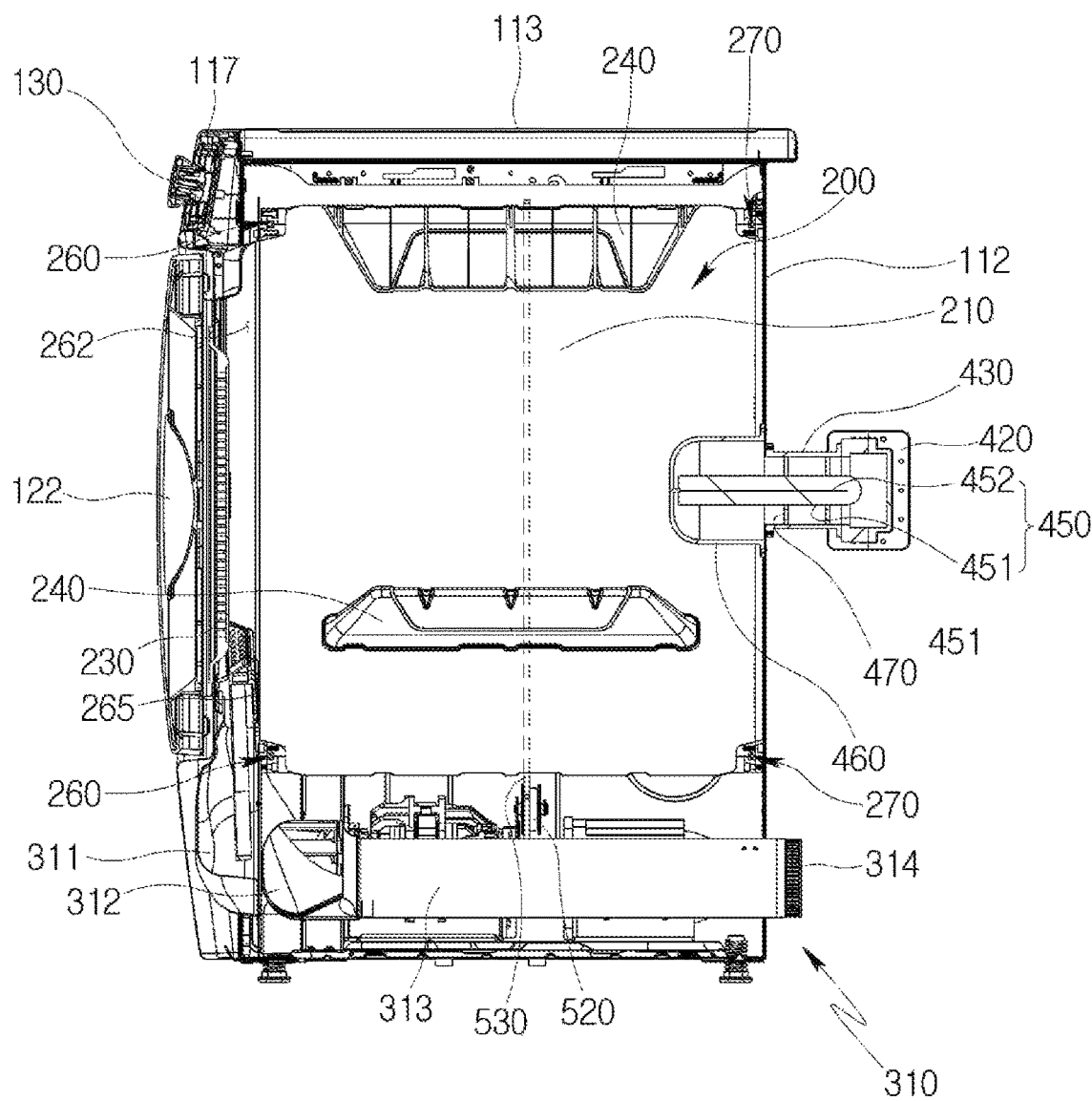
FIG. 2 is a cross-sectional view illustrating an example of an internal structure of the laundry drying machine.
Figure 3:
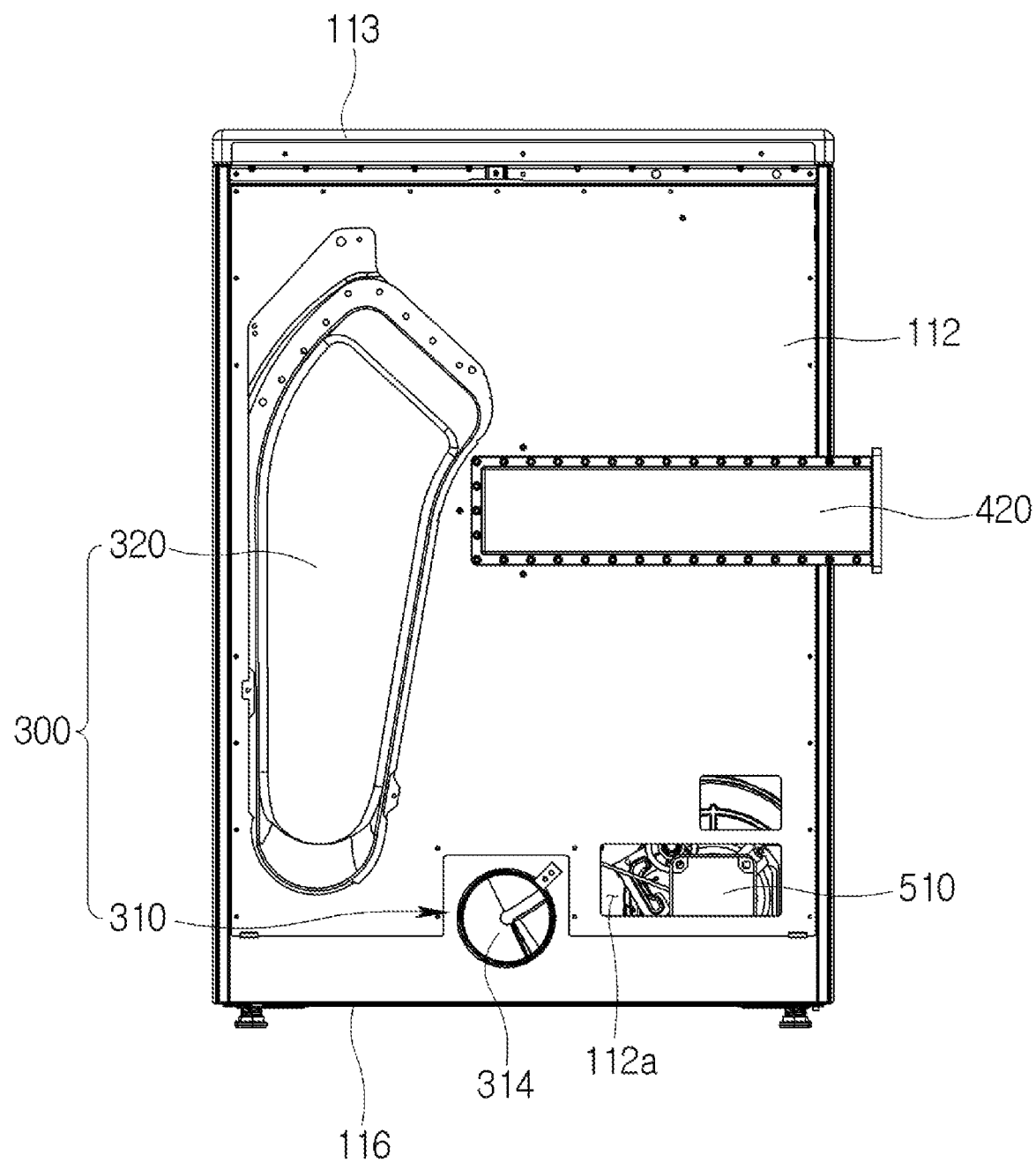
FIG. 3 is a rear view illustrating the laundry drying machine as viewed from a rear.
Figure 4:
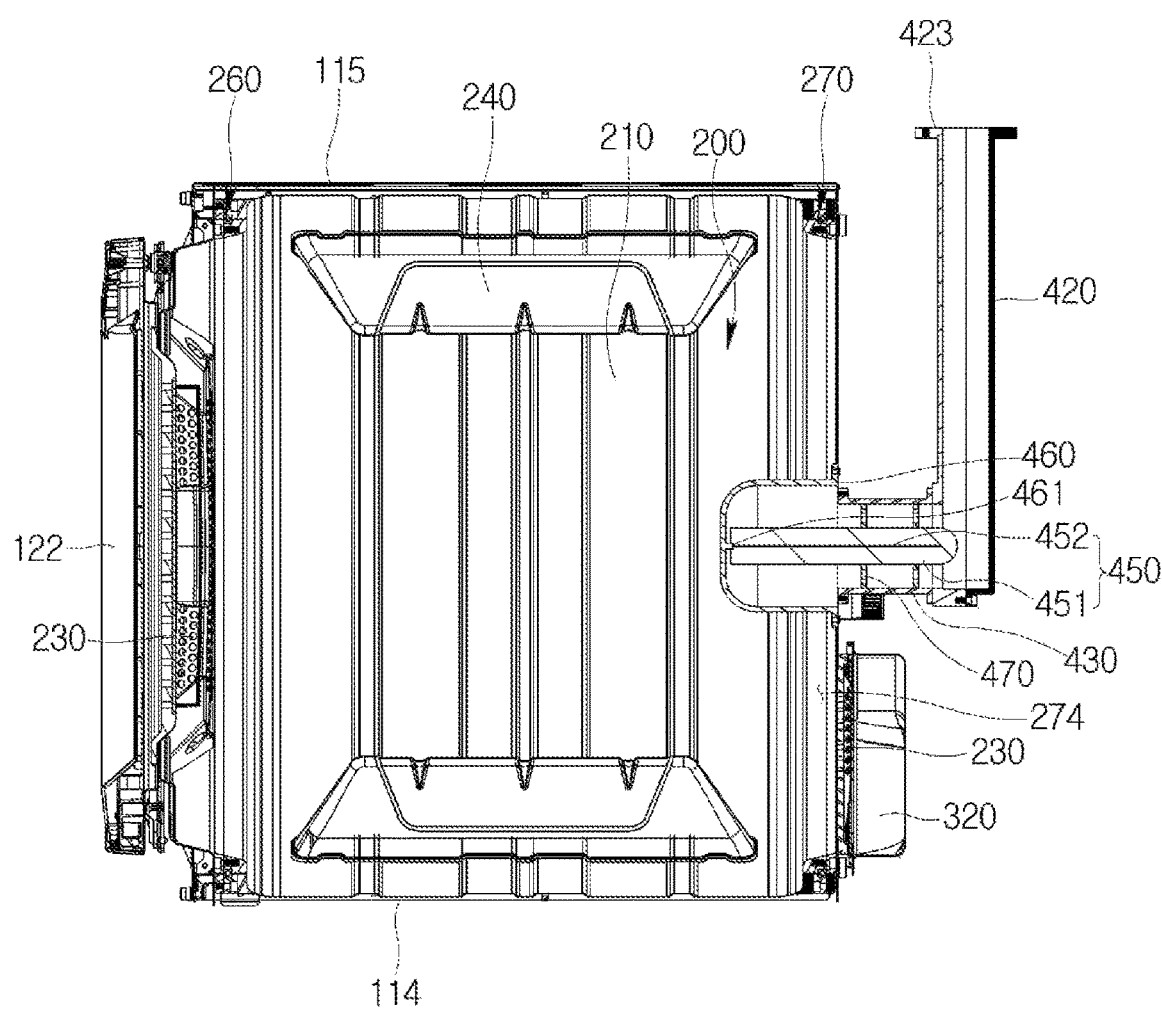
FIG. 4 is a cross-sectional view illustrating the laundry drying machine, as viewed from above.

FIG. 1 shows a view illustrating an external appearance of an example of a laundry drying machine, FIG. 2 shows a cross-sectional view illustrating an example of an internal structure of the laundry drying machine, FIG. 3 shows a rear view of the laundry drying machine 1 as viewed from a rear, and FIG. 4 shows a cross-sectional view of the laundry drying machine 1 as viewed from above.

In some implementations, as shown in FIGS. 1 to 4, a cabinet 100 forming an external body of the laundry drying machine 1 includes a front panel 111 constituting the front surface of the laundry drying machine 1, a rear panel 112 constituting the rear surface of the laundry drying machine 1, a pair of side panels 114 and 115 constituting the side surfaces of the laundry drying machine 1, and an upper panel 113 constituting the upper surface of the laundry drying machine 1.

The cabinet 100 can define an inner space of the laundry drying machine 1, support various components of the laundry drying machine 1, and protect it from an outside.

An inlet 121 provided to communicate with a drum 200 to be described later and a door 122 coupled to the cabinet 100 to open and close the inlet 121 can be disposed on the front panel 111. One side of the door 122 can be hinged to the front panel 111 so that it can be opened and closed by a user.

In some implementations, a door handle 123 can be provided on one side of the outer surface of the door 122. The door handle 123 can be gripped by a hand so that a user can easily open and close the door 122. The position of the door handle 123 can be disposed on the other side opposite to the one side to which the door 122 and the front panel 111 are coupled so that the user can open the door 122 with little force. Accordingly, the user opens the door 122 by gripping the door handle 123, puts the subject to be dried into the inner space of the drum 200 through the inlet 121, and then closes the door 122 again to perform a drying function in a state in which the laundry drying machine 1 is blocked from an outside.

In some implementations, a control panel 117 can be provided on an upper portion of the front panel 111.

The control panel 117 can include an input part 130 to receive a control command from the user, a display 140 to output information such as the control command selectable by the user, and a main controller or one or more processors configured to control a command for performing the operation of the laundry drying machine 1.

In some examples, the input part 130 can be configured to include a power supply request part to request power supply to the laundry drying machine, a course input part to allow the user to select a desired course among a plurality of courses, an execution request part to request the start of the course selected by the user, and the like.

Referring to the implementation of FIG. 1, the input part 130 can be formed as a dial through which the user can input a control command by rotating it by a preset angle. However, the present disclosure is not limited thereto, and the present disclosure can be provided with various configurations through which the user can intuitively input the control command, such as a touch screen panel that can be input through a touch, and a plurality of buttons that can set the contents of the input.

The display 140 can be configured to include at least one of a display panel or a light emitting diode panel capable of outputting characters and/or figures, and a speaker capable of outputting a voice signal and sound. The user can easily grasp the status of a current administrative status, a remaining time, and the like through the information output through the display 140.

A drum 200 that is rotatably provided inside the cabinet 100 and provides a space for receiving clothes (a subject to be dried), a duct part 300 that forms a flow path for re-supplying the air discharged from the drum 200 to the drum 200, and an electrode part 400 that is connected to the drum 200 and forms an electric field for heating the subject to be dried in the inner space of the drum 200 are provided inside the cabinet 100. The duct part 300 can include one or more ducts.

The drum 200 can rotate clockwise or counterclockwise about one axis passing through the front and rear. In consideration of the drying function, the rotation direction can be changeable, and further, it can be set to rotate in one direction for a predetermined time and then rotate in the other direction according to a design.

The drum 200 can include a cylindrical drum body 210 having an open front surface, a first support part 260 rotatably supporting the front surface of the drum body 210 inside the cabinet 100, and a second support part 270 rotatably supporting the rear surface of the drum body 210.

The first support part 260 can be configured to include a first fixed body 261 that is fixed to the inside of the cabinet 100, a drum inlet 262 that is provided to penetrate the first fixed body 261 to communicate the inlet 121 and the inside of the drum body 210, and a first support body 263 that is provided in the first fixed body 261 and is inserted into the front surface of the drum body 210.

The first support part 260 can be configured to further include a connection body 264 connecting the inlet 121 and the drum inlet 262. The connection body 264 can be provided in a pipe shape extending from the drum inlet 262 toward the inlet 121. In addition, the connection body 264 can be provided with an air outlet 265 communicating with the duct part 300.

The air outlet 265 is a passage for allowing the internal air of the drum body 210 to move to the duct part 300, and it can be provided as a through hole provided to penetrate the connection body 264.

The second support part 270 is configured to include a second fixed body 271 that is fixed inside the cabinet 100 and a second support body 272 that is provided in the second fixed body 271 and inserted into the rear surface of the drum body 210.

The second support part 270 is provided with an air inlet 273 provided to pass through the second fixed body 271 to communicate the inside of the drum body 210 with the inside of the cabinet 100.

The air inlet 273 communicates with a discharge port 322 of a supply duct 320 to be described later, so that it can perform as a passage in which the air discharged from the supply duct 320 is guided to the inner space of the drum body 210. In order to prevent the outflow of air, the air inlet 273 can be formed to correspond to the discharge port 322 or can be formed to be wider than the width of the discharge port 322.

A coupling hole 220, which is described in greater detail later, can be disposed in the second support part 270, and the coupling hole 220 can be defined as an open space. Correspondingly, the coupling hole 220 can be disposed through the second fixed body 271 and the second support body 272.

The drum 200 includes the coupling hole 220 that is opened and formed in a circular shape of a certain radius on the central axis of an outer surface, and an electromagnetic shielding part 230 that is disposed to block external leakage of the electromagnetic wave formed inside the drum 200.

The coupling hole 220 is defined as an open space through which the electrode part 400 to be described later can project the electromagnetic wave into the inner space of the drum 200. The coupling hole 220 can be formed on the rear side of the drum body 210 to correspond to a hole formed in the rear panel 112.

More specifically, the coupling hole 220 can be disposed through the second fixed body 271 and the second support body 272. Accordingly, the inner space of the drum 200 can be connected to an outside through the coupling hole 220 and the hole formed in the rear panel 112.

Figure 12:
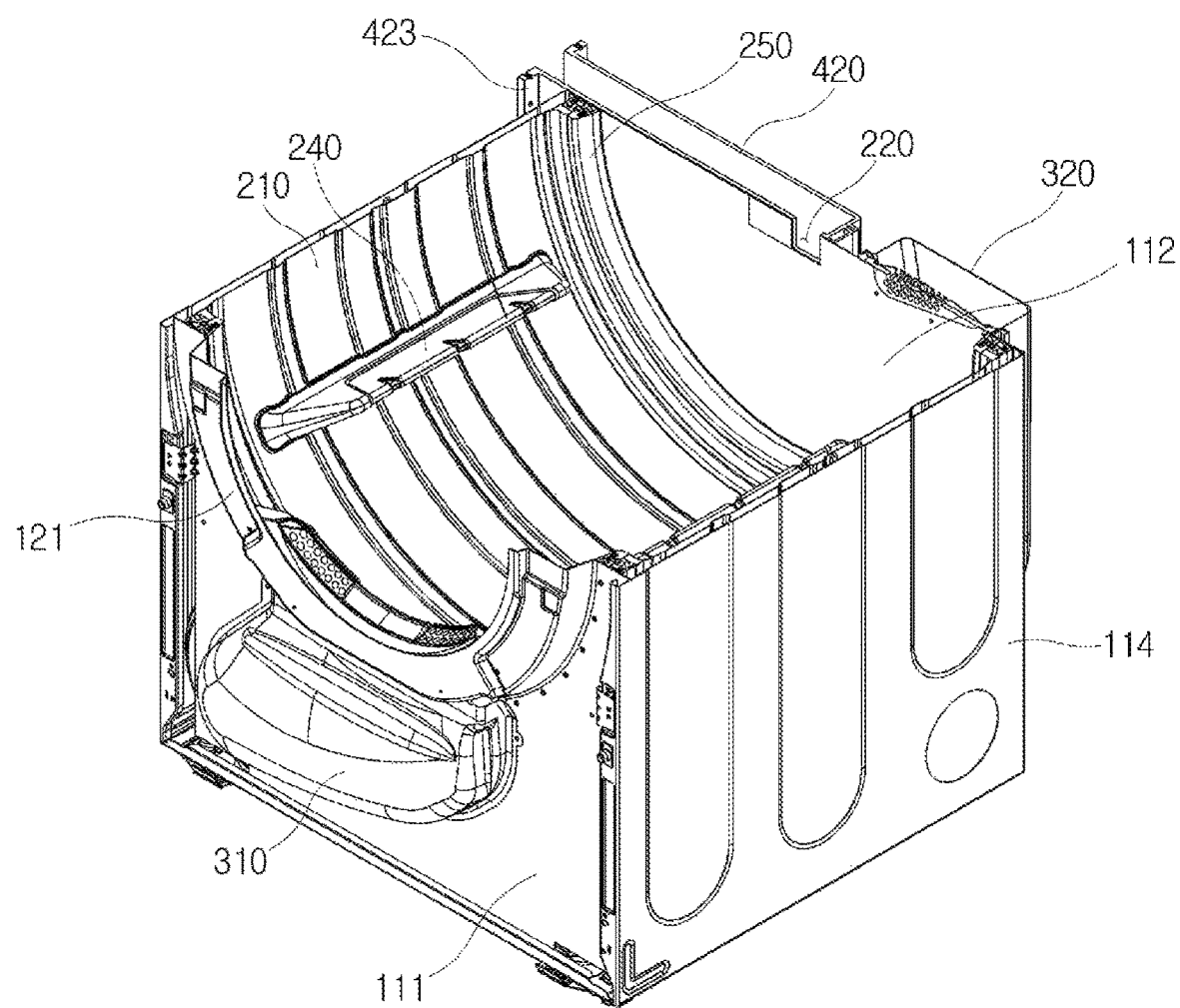
FIG. 12 is a partial perspective view illustrating an example of a laundry drying machine.

In some examples that do not include a separate antenna configuration, the coupling hole 220 can perform an antenna function (see FIG. 12). The resonance of electromagnetic wave formed in the inner space of the drum 200 is provided for drying the subject to be dried, and the shape of the coupling hole 220 can be designed to set a resonance region. In some examples, a probe 450 of the electrode part 400, which will be described later, can serve as a separate antenna.

According to the implementation of FIG. 2, the electrode part 400 can form an electric field in the inner space of the drum 200 through the coupling hole 220 and the hole formed in the rear panel 112.

The electromagnetic shielding part 230 is disposed to prevent the electromagnetic wave projected by the electrode part 400 from leaking out from the inner space of the drum 200. The present disclosure is characterized in that an electric field is formed in the inner space of the drum 200 by the electrode part 400 to be described later, and the subject to be dried is heated and dried by the electric field. By these features of the present disclosure, the implementation of the present disclosure includes the electromagnetic shielding part 230 to prevent leakage of electromagnetic wave to the outside of the laundry drying machine 1.

If a human body is exposed to the electromagnetic wave of a certain intensity or more, it can have a harmful effect. In particular, the present disclosure uses a high-power radio frequency (RF) electromagnetic wave to vibrate the water molecules contained in the subject to be dried, and the electromagnetic shielding part 230 can be helpful to block the RF electromagnetic wave. For example, the electromagnetic shielding part 230 can be formed on the outside and open portion of the drum 200.

In order to achieve electromagnetic shielding, a certain space can include a cavity that is surrounded by a conductor or a ferromagnetic material, and the inside thereof is surrounded by a conductor. The drum body 210 and a probe cover 460 to be described later can be formed of a conductor or a metal. In the inner space of the drum, which is a space other than the drum body 210 and the probe cover 460 and the inner circumferential surface, the electromagnetic shielding part 230 can be formed by selecting various materials having an effect of blocking or absorbing the electromagnetic wave.

Referring to FIG. 2, the electromagnetic shielding part 230 can be disposed in an open space toward the front of the drum 200. Therefore, the electromagnetic shielding part 230 can be disposed between the drum body 210 and the door 122, and it can be formed in the shape of a disk corresponding to the shape of the front side of the drum body 210.

The electromagnetic shielding part 230 can be disposed between the space in which the drum 200 and the duct part 300 to be described later are coupled. That is, in order to prevent the electromagnetic wave from flowing out along a flow path in which air is introduced into the inner space of the drum body 210 and discharged to the outside again, the electromagnetic shielding part 230 can be disposed between the drum 200 and the duct part 300.

More specifically, referring to FIG. 4, the electromagnetic shielding part 230 can be disposed between the space in which the drum 200 and the supply duct 320 are coupled. The air inlet 273 provided in the second support part 270 of the drum 200 and the discharge port 322 provided in the supply duct 320 can communicate with each other so that air can be introduced. Thus, the electric field formed in the inner space of the drum 200 can be discharged to the outside through the discharge port 322. Therefore, in order to prevent this, the electromagnetic shielding part 230 is disposed between the air inlet 273 and the discharge port 322, and then, it can be coupled together.

The drum 200 can further include a drum lifter 240 formed to protrude from the inner circumferential surface of the drum body 210 toward the inner space.

The drum lifter 240 can be provided to increase the pressure of the fluid rotated in the inner space of the drum body 210 and to mix the fluid by complicatedly deforming the flow path. The fluid rotating in the inner space of the drum body 210 can be composed of air and a subject to be dried. In this case, the subject to be dried can be continuously mixed in order to increase drying efficiency.

The drum body 210 is a cylinder rotating about an axis, and the subjects to be dried may be difficult to be mixed by rotating at the same speed. Accordingly, the laundry drying machine 1 can include the drum lifter 240 so that the subjects to be dried collide with the drum lifter 240 and mix each other while rotating according to the drying function.

According to the implementation of FIG. 2, the drum lifter 240 can be formed in the shape of a blade extending from the drum body 210 to the inner space and narrowing in width. Therefore, the drum lifter 240 can have an inclined triangular cross-section, so that the radial flow path formed in the inner space of the drum 200 can be diversified.

The drum lifter 240 can be provided in various sizes and numbers in consideration of the diameter and rotational speed of the drum body 210, the volume and weight of a subject to be dried to be disposed, and the like. The implementation of FIGS. 2 and 4 shows that the three drum lifters 240 are arranged to have an angle of 120° in the circumferential direction along the inner circumferential surface of the drum body 210, respectively. If the height of the drum lifter 240 is increased or the area of the drum lifter 240 is increased, the number can be reduced in consideration of this, and if the height is decreased or the area is decreased, the number can be increased. In order to diversify the internal flow path of the drum 200 within a range that does not impede the rotation of the subject to be dried, a design can be variously changed.

The duct part 300 includes an exhaust duct 310 that is connected to the front of the drum 200 to discharge air from the inner space of the drum body 210 and a supply duct 320 (see FIG. 7) that is connected to the rear of the exhaust duct 310 to supply air to the inner space of the drum body 210. The direction in which the exhaust duct 310 and the supply duct 320 are connected to the drum 200 can be arranged so that the front and rear are changed from each other according to a design.

Referring to FIG. 2, the exhaust duct 310 can be connected to the air outlet 265 formed in the first support part 260 of the drum 200 to introduce air to the inner space of the drum body 210. In order to prevent air from leaking out of the drum 200, the exhaust duct 310 is formed at one end connected to the drum 200, so that the shape of a hole through which air is introduced into the duct can correspond to the shape of the air outlet 265 or can be formed wider than the shape of the air outlet 265.

The exhaust duct 310 includes an exhaust port 314 that discharges air to the outside of the cabinet 100. Therefore, the air of the drum 200 is introduced into the exhaust duct 310 through the air outlet 265 in the inner space of the drum body 210, and then is discharged to the outside through the exhaust port 314.

The exhaust duct 310 can include an intake fan 312 that provides power to move air toward the exhaust port 314. The intake fan 312 is disposed inside the exhaust duct 310 and rotates to generate a flow force so that air flows toward the exhaust port 314 over the exhaust duct 310. The position of the intake fan 312 can be disposed close to the exhaust port 314 or, conversely, can be disposed close to the air outlet 265. That is, in some implementations, it can be freely selected in consideration of the shape and arrangement of the components on the same flow path line.

Referring to FIG. 2, in some implementations, the intake fan 312 can be disposed closer to the air outlet 265. Accordingly, the moisture evaporated by heating the subject to be dried in the inner space of the drum 200 can be discharged to the outside more quickly before the vapor is condensed again.

By the operation of the intake fan 312, the inner space of the drum body 210 can be defined as a negative pressure state having a lower pressure than that of the atmosphere. Accordingly, the supply duct 320 to be described later can supply air to the inner space of the drum body 210 even if it does not include a fan.

Figure 7:
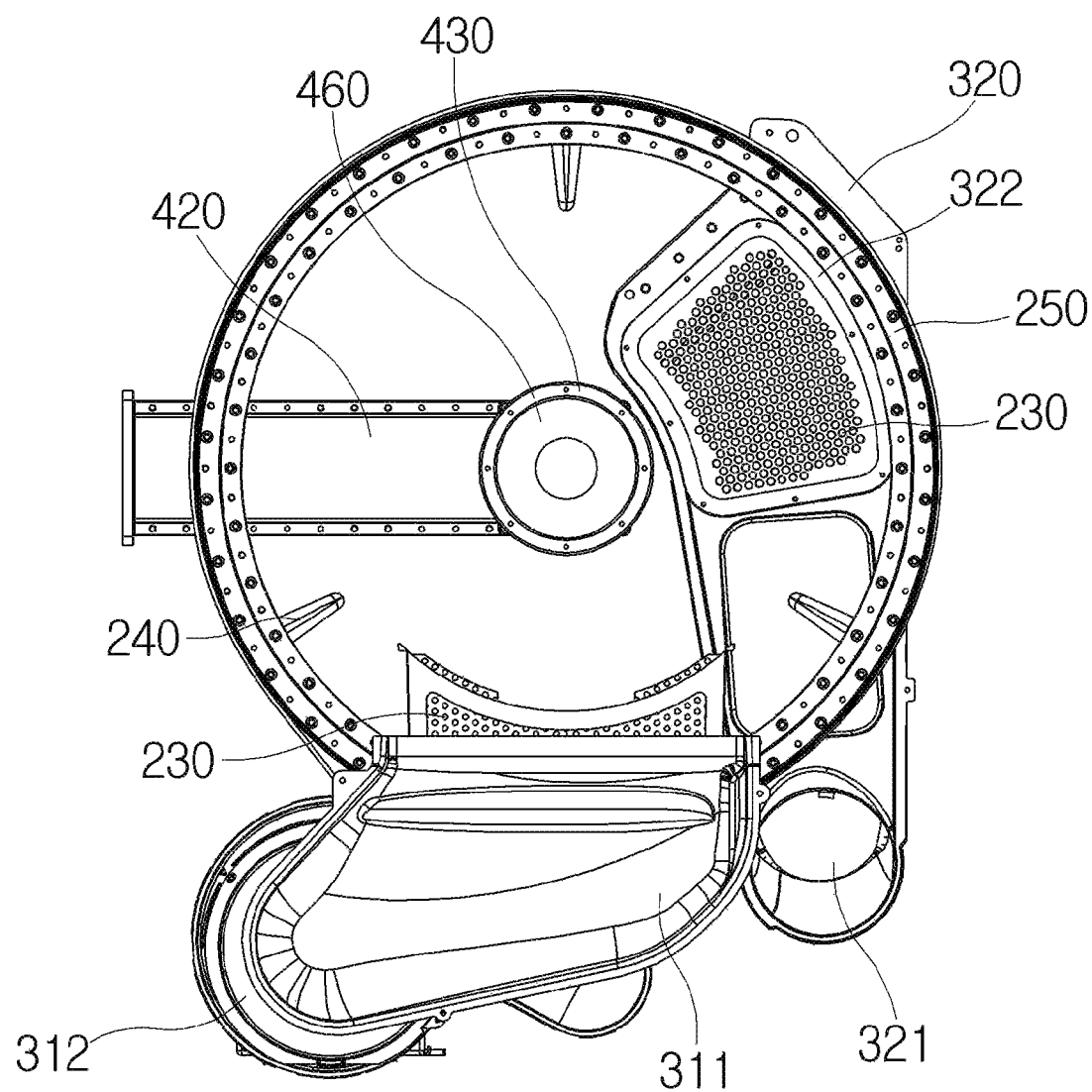
FIG. 7 is a front view illustrating the internal configuration of the laundry drying machine as viewed from a front.

The supply duct 320 can include an air intake port 321 that inhales air from the outside and the discharge port 322 that discharges air into the inner space of the drum body 210 (see FIG. 7).

The discharge port 322 can be disposed on one surface of the upper side of the supply duct 320, and it can be in contact with the second support part 270 to communicate with the air inlet 273.

In some implementations, the discharge port 322 can have the same shape as the air inlet 273 in order to help to prevent air leakage in the process of guiding the air from the supply duct 320 to the drum 200. In some implementations, the discharge port 322 can have an area smaller than that of the air inlet 273 so that it can be fitted and coupled.

The supply duct 320 serves as a passage through which the air introduced through the air intake port 321 is guided to the inner space of the drum body 210 through the discharge port 322. The supply duct 320 can include a separate fan. However, as described above, according to the implementation of FIG. 2, the supply duct 320 may not be provided with a separate fan. A negative pressure is formed in the inner space of the drum body 210 by the intake fan 312 disposed in the exhaust duct 310, and an air flow path can be formed from the supply duct 320 to the drum body 210 by the pressure difference.

In the implementation in which the supply duct 320 is provided with a fan providing power for introducing air into the drum body 210, disposing the intake fan 312 in the exhaust duct 310 can be omitted. That is, when air is introduced into the inner space of the drum body 210 by the fan disposed in the supply duct 320, the inner space of the drum body 210 instantaneously forms a pressure higher than atmospheric pressure. Therefore, without artificial pressurization of the fan by the pressure difference between the inner space of the drum body 210 and the inside of the exhaust duct 310, air can be discharged from the inner space of the drum body 210 toward the exhaust duct 310.

The internal air flow path of the laundry drying machine 1 can be defined so that air is introduced into the drum 200 through the supply duct 320 and then discharged to the outside through the exhaust duct 310. As described above, the laundry drying machine 1 can include at least one fan on the internal air passage. Accordingly, the moisture evaporated from the subject to be dried can be discharged to the outside along the air flow path.

The laundry drying machine 1 includes an electrode part 400 that forms an electric field to heat the subject to be dried.

More specifically, the electrode part 400 can form an electric field by projecting the electromagnetic wave into the inner space of the drum 200. Accordingly, the subject to be dried can be heated and dried by the electric field. The electric field formed by the electrode part 400 can include a high-frequency electric field. The frequency range of the electric field can be appropriately selected in consideration of the properties or moisture content of the subject to be dried, and the like.

A water ($H_2O$) molecule is a polar molecule in which the hydrogen atom has a positive charge and the oxygen atom has a negative charge. Therefore, when the electromagnetic wave is radiated to the subject to be dried containing water molecules, and when the electric field of the electromagnetic wave vibrates positively and negatively, the water molecules rotate very quickly, changing the positive and negative directions, and align along the direction of the electric field. As water molecules rotate, attractive and repulsive forces occur with each other, and collisions can occur due to movement by the force. The energy generated at this time increases the temperature. Therefore, the moisture of the heated subject to be dried can be removed.

The heating of water molecules can be particularly strong in the resonance region. Accordingly, in order to increase the efficiency of the laundry drying machine 1, the electrode part 400 can be configured to select a frequency band corresponding to the resonance region of water molecules in the inner space of the drum 200. A detailed configuration of the electrode part 400 for widening the frequency band corresponding to the resonance region will be described later with reference to FIG. 8 and subsequent drawings.

Referring to FIGS. 2 and 4, the electrode part 400 includes an oscillator 410, a probe housing 430, a probe 450, and a probe cover 460.

The oscillator 410 generates the electromagnetic wave for drying the subject to be dried. The output of the electromagnetic wave generated by the oscillator 410 can be changed in response to the selection of the detailed configuration of the electrode part 400. In consideration of the moisture content of the subject to be dried, the volume of the inner space of the drum 200, the mass of the subject to be dried disposed in the inner space, and the like, the oscillator 410 having a variable output can be provided.

Typically, the oscillator 410 is designed to generate the electromagnetic wave with a constant output. Therefore, it can be used together with a device that adjusts the electromagnetic wave output from the oscillator 410 to a frequency corresponding to the resonance region, such as a matcher or a tuner.

The probe housing 430 can be formed in a cylindrical shape to be connected to the coupling hole 220 at the outside. Both ends of the probe housing 430 can have a disk extending by a predetermined length in a radial direction so as to be coupled with other components, respectively (see FIG. 13).

The probe 450 is introduced into the inner space of the drum 200 through the coupling hole 220. The probe 450 serves as an antenna for radiating the electromagnetic wave into the inner space of the drum 200.

As described above, the oscillator 410 that generates the electromagnetic wave of a constant output can be used together with a device that adjusts the electromagnetic wave to a frequency corresponding to a resonance region of moisture. However, when the electromagnetic wave is directly projected in the inner space of the drum 200 through the probe 450, the resonance region can be expanded, so that the electromagnetic wave can dielectrically heat the subject to be dried without a separate device. Through this, the laundry drying machine 1 can evaporate the moisture of the subject to be dried by dielectric heating without a separate control device.

In order to uniformly radiate the electromagnetic wave to the inner space of the drum 200 to form an electric field, the probe 450 can be disposed on the central axis of the cylindrical drum 200. In addition, the probe 450 can be formed in a cylindrical shape to correspond to the shape of the drum 200 in order to uniformly radiate the electromagnetic wave into the inner space of the drum 200.

Referring to FIG. 2, the probe 450 can be configured to include a probe body 451 and an electrode pin 452.

The probe body 451 can have a hollow cylindrical shape forming the external shape of the probe 450. In order to project the electromagnetic wave, the probe body 451 can be made of a conductor or a conductor.

In some examples, as shown in FIG. 2, one end of the probe body 451 toward the inner space of the drum 200 can be formed in a circular shape.

In addition, the other end of the probe body 451 can be formed in a hemispherical or streamlined convex shape. However, the present disclosure is not limited thereto. For example, the probe body 451 can be coupled with the connector 440 (see FIG. 9), and the probe body 451 can be formed in the form of an open hole. The shape of the probe body 451 will be described later with reference to FIG. 8 and subsequent drawings.

The electrode pin 452 can be inserted into an empty space inside the probe body 451 to be fixedly disposed. In order to minimize the loss of electromagnetic wave transmitted from the oscillator 410 and increase the output of the electric field formed in the inner space of the drum 200, the electrode pin 452 can be formed of a high-conductivity conductor.

Referring to FIGS. 2 and 4, the electrode pin 452 can be disposed in the inner space of the probe body 451. In order to evenly radiate the electromagnetic wave, the electrode pin 452 can be disposed on the central axis of the probe body 451. The electrode pin 452 can be inserted and fixed into the fixing hole 451*a* of the probe body 451, and the coupling structure will be described later (see FIG. 10).

Referring to FIGS. 2 and 4, one electrode pin 452 is disposed in the inner space of the probe body 451. In some implementations, in order to increase the conductivity of the probe 450, the electrode pin 452 can be provided in plurality. A detailed structure of the probe 450 including the plurality of electrode pins 452 will be described later (see FIG. 9).

The probe cover 460 can be formed to protrude cylindrically toward the inner space of the drum 200 along the outer circumferential surface of the coupling hole 220. The probe cover 460 can prevent the probe 450 from being directly exposed in the inner space of the drum 200.

More specifically, when the probe 450 is directly exposed in the inner space of the drum 200, the subject to be dried moving by the rotation of the drum body 210 can collide with the probe 450 when the drying function is activated. Accordingly, the position of the probe 450 can be changed or damaged due to the impact, and the subject to be dried can be caught or tangled in the probe 450, thereby causing an obstacle in the circulation operation. Furthermore, when the subject to be dried is entangled in the probe 450, the electromagnetic wave emitted from the probe 450 may not propagate into the inner space of the drum 200.

In some implementations, the laundry drying machine 1 can include a probe cover 460 to separate the probe 450 and the inner space of the drum 200.

The probe cover 460 can be formed of a conductive material so that the electromagnetic wave radiated from the probe 450 can propagate into the inner space of the drum 200. Therefore, the electromagnetic wave can be transmitted from the oscillator 410 to the probe 450 and then propagate to the drum body 210 through the probe cover 460 to form an electric field.

In addition, the probe cover 460 can be made of a conductive material, and the inner space of the drum 200 can be formed as a cavity surrounded by a conductor. Through this, the electromagnetic wave in the inner space of the drum 200 can be shielded from the outside.

The probe cover 460 can be formed in a cylindrical shape sharing an axis with the central axis of the drum body 210 so as to uniformly radiate the electromagnetic wave to the inner space of the drum 200. As described above, in order to separate the probe 450 and the inner space of the drum 200, one end facing the inner space of the drum 200 can be formed in a closed cylindrical shape.

Figure 8:
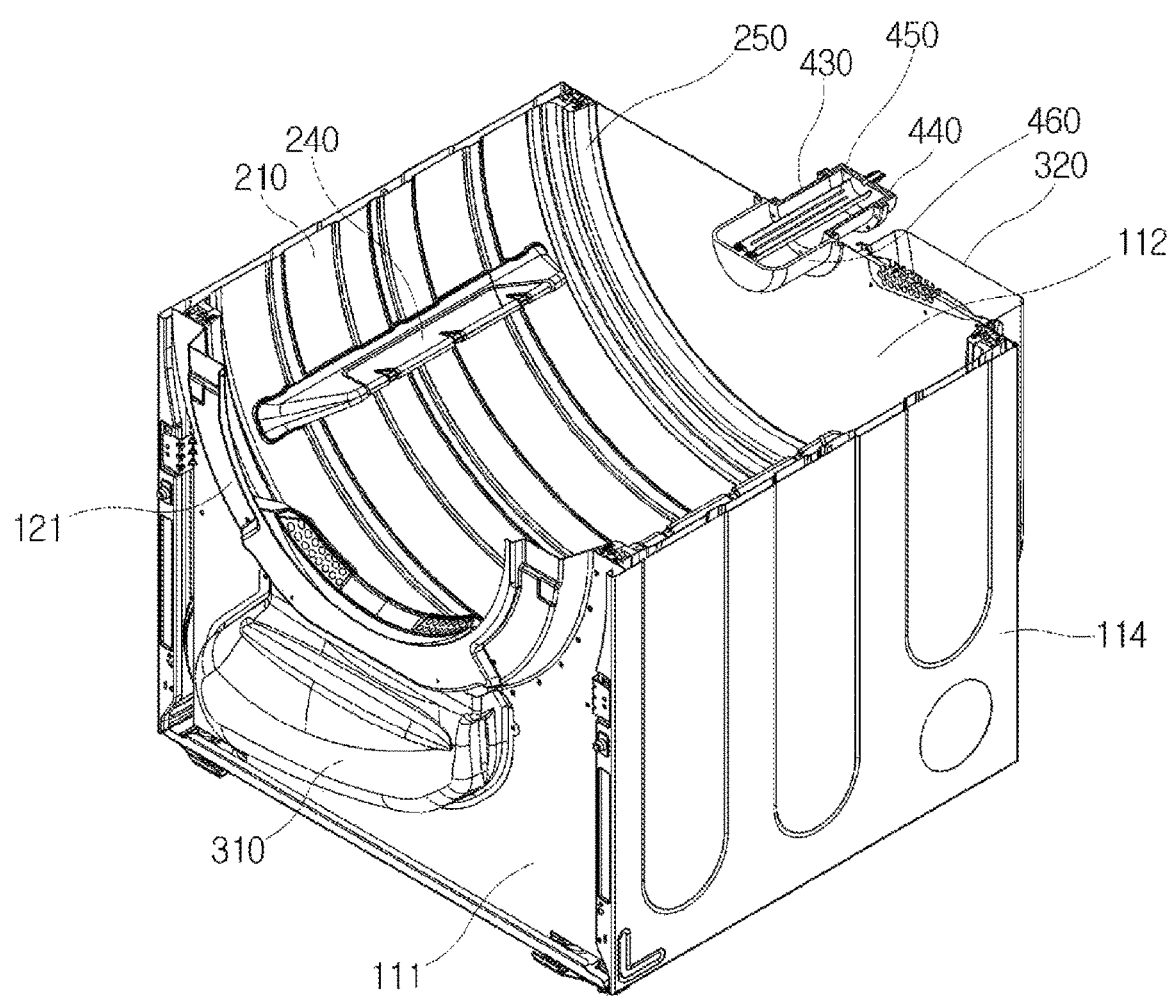
FIG. 8 is a partial perspective view of an example of a laundry drying machine.

The electrode part 400 of the laundry drying machine 1 can further include at least one of a guide 420 and a connector 440 (see FIG. 8).

As described above, the electrode part 400 includes the oscillator 410 and the probe 450. Referring to FIG. 2, the probe 450 may not include a connection part connected to the oscillator 410, and a separately connected configuration can be provided.

For example, the guide 420 or connector 440 can serve as a connection path for electromagnetic wave that guides the electromagnetic wave generated by the oscillator 410 to the probe 450. Therefore, the laundry drying machine 1 can include one configuration of the guide 420 and the connector 440. However, other configuration that can serve as a connection path for electromagnetic wave can be freely selected, and it is obvious that it is included in the scope of the present disclosure. The detailed structure and coupling relationship of the guide 420 and the connector 440 will be described below with reference to various implementations of the present disclosure.

The cylindrical drum body 210 can rotate through various types of driver or driving part 500.

In some implementations, as shown in FIG. 2, the driving part 500 can include a drum motor 510 (see FIG. 5) fixed inside the cabinet 100, a pulley 520 rotated by the drum motor 510, and a belt 530 connecting the circumferential surface of the pulley 520 and the circumferential surface of the drum body 210.

As the drum motor 510, various types of motors used in the industry, such as a DC motor, an induction motor, a synchronous motor, and a commutator motor, that can provide rotational force can be selected and used.

Referring to FIG. 2, the first support part 260 can be provided with a first roller R1 that rotatably supports the circumferential surface of the drum body 210, and the second support part 270 can be provided with a second roller R2 that rotatably supports the circumferential surface of the 210.

However, the present disclosure is not limited thereto. For example, a direct drive type driving part 500 can include the drum motor 510 that is directly connected to the drum 200 without going through the pulley 520 and the belt 530 to rotate the drum 200.

In some implementations, where the direct driving type driving part 500 is applied, the position of the drum motor 510 can be disposed on the rotation shaft of the drum body 210. In some examples, the position of the probe 450, which will be described later, may not be coaxially arranged.

Alternatively, the drum motor 510 and the probe 450 can be coupled to be coaxially disposed. In some examples, the probe 450 can be coupled to the inside in which the drum motor 510 is coupled to the drum body 210.

In some examples, the direct drive type driving part 500 is within the scope of the present disclosure. For convenience, the following description will be based on the illustrated implementation of the driving part 500.

In addition, the laundry drying machine 1 can further include a first filter part F1 and a second filter part F2 as a means for removing foreign substances such as lint and dust generated in the drying process of laundry such as clothes.

A first filter part F1 is provided in the exhaust duct 310 to primarily filter foreign substances contained in the air discharged from the drum 200.

A second filter part F2 is provided in the supply duct 320 to filter foreign substances contained in the air introduced into the drum 200 in the inner space of the laundry drying machine 1.

As for the detailed configuration of the first filter part F1 and the second filter part F2, any means known in the art can be applied, and the description of the detailed configuration will be omitted.

The controller is configured to control the operation of the laundry drying machine 1 based on a user input applied through the input part 130. The controller can be composed of a printed circuit board and elements disposed on the printed circuit board. When the user inputs a control command such as selecting a clothes treatment course or operation of the laundry drying machine 1 through the input part 130, the controller can control the operation of the laundry drying machine 1 according to a preset algorithm.

FIGS. 2 to 4 show an example of the electrode part 400 that includes the guide 420.

The guide 420 has one end connected to the probe housing 430 and the other end connected to the oscillator 410, and it can function as a connection path through which the electromagnetic wave generated from the oscillator 410 is guided. The function of the guide 420 will be described later by comparing various implementations of the present disclosure with reference to FIG. 8 and subsequent drawings.

Referring to FIGS. 3 and 4, the guide 420 can be extended by a predetermined length from one end connected to the probe housing 430, and then bent vertically toward one side to extend. More specifically, the guide 420 can be bent and extended toward the left or right.

The length of the guide 420 extending can be formed to be longer than the distance from the coupling hole 220 to any one of the left and right ends of the rear panel 112. Accordingly, the other end of the guide 420 connected to the oscillator 410 can be disposed at a position outside the rear panel 112. Accordingly, the laundry drying machine 1 secures a view when the oscillator 410 is connected to the guide 420 and provides a working space, thereby providing process convenience.

In some implementations, a predetermined length extending from one end of the guide 420 connected to the probe housing 430 can be designed as a minimum within a range capable of maintaining the amplitude of the RF electromagnetic wave. In some examples, the laundry drying machine 1 can be arranged to have the rear thereof face the wall. Accordingly, when the predetermined length is increased, the space occupied by the laundry drying machine 1 is widened and the laundry drying machine 1 protrudes forward, which can cause inconvenience to a user and adverse aesthetic effects. In some examples, the predetermined length can be minimized within a range that can secure the function of the guide 420.

Referring to FIG. 4, at one end of the guide 420 connected to the oscillator 410, a guide connection part 423 extending vertically by a predetermined width along the circumference can be formed.

The area of the guide connection part 423 can be formed to correspond to the area of the oscillator 410 in order to couple to and support the oscillator 410. The oscillator 410 is a device that vibrates an electric signal at a frequency by magnetic force, and among the oscillators 410 commonly used in the industry, one selected in consideration of output, volume, appearance, and the like can be used in the laundry drying machine 1. Accordingly, the area of the guide connection part 423 can be changed according to the external shape of the oscillator 410 selected by a designer.

Hereinafter, the internal configuration of the laundry drying machine 1 will be described with reference to FIGS. 5 to 7.

Figure 5:
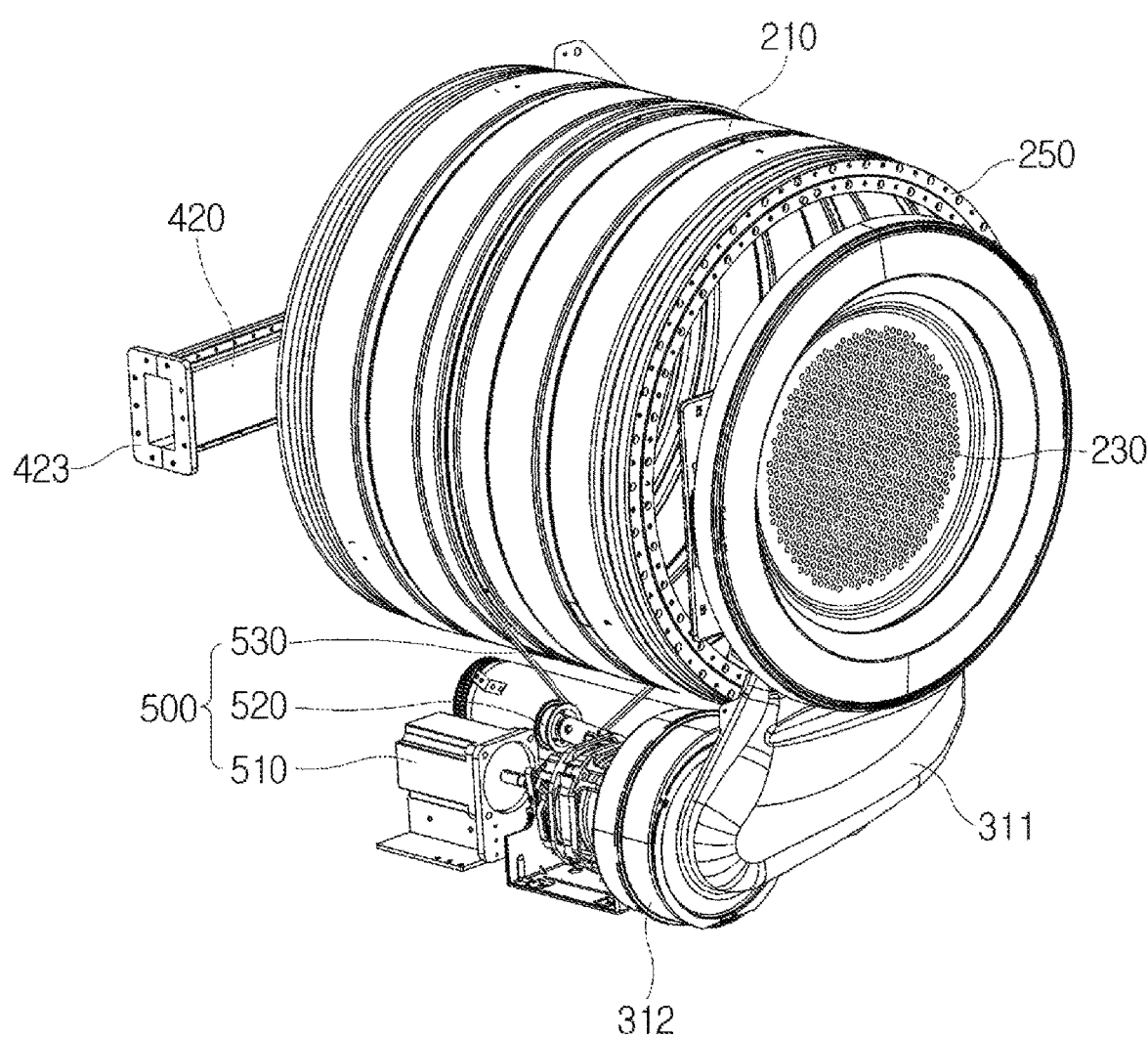
FIG. 5 is a perspective view illustrating an example of an internal configuration of the laundry drying machine.
Figure 6:
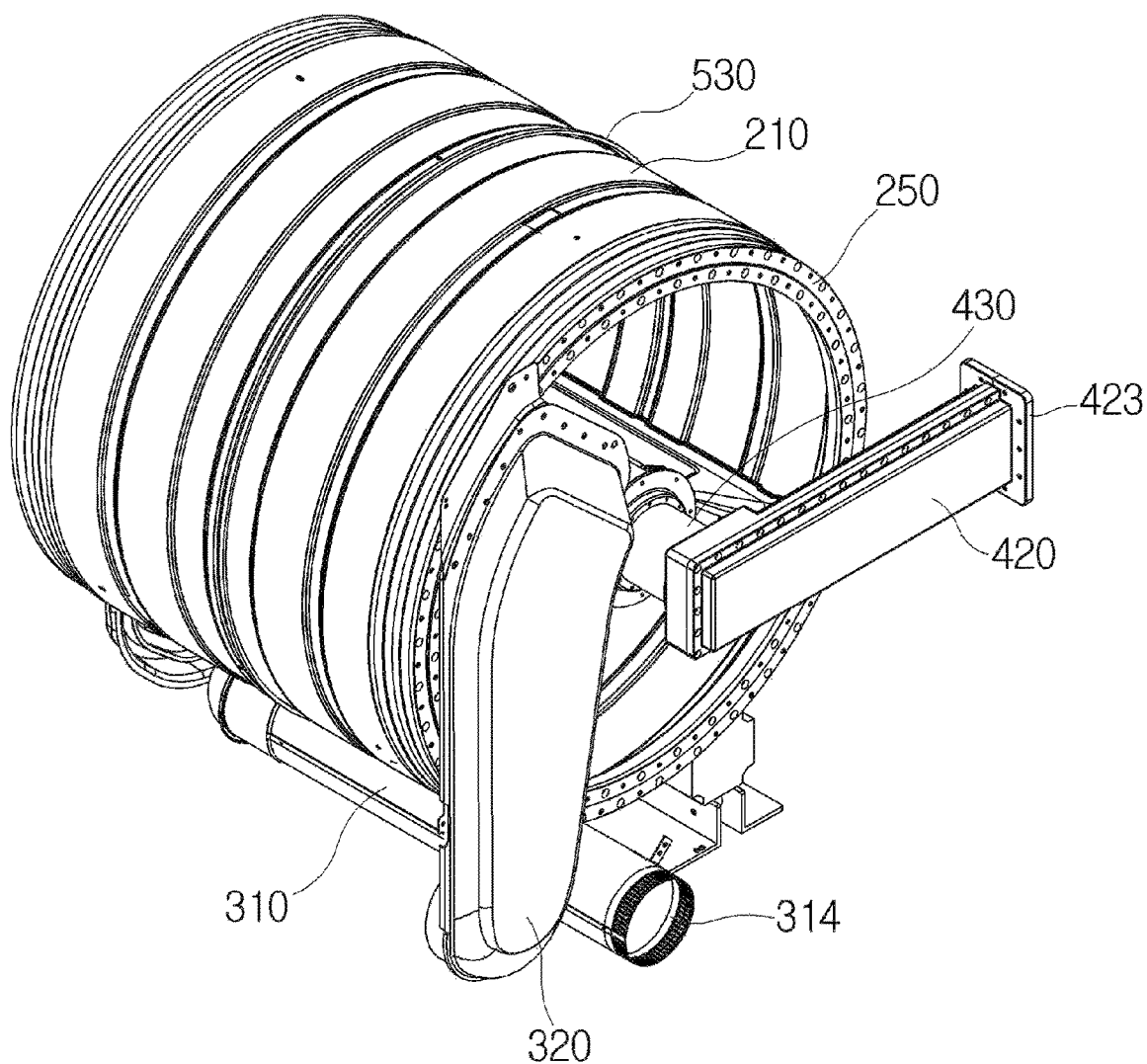
FIG. 6 is a perspective view illustrating the internal configuration of the laundry drying machine as viewed from a rear.

FIG. 5 shows a perspective view of the internal configuration of the laundry drying machine 1, FIG. 6 shows a perspective view of the internal configuration of the laundry drying machine 1 viewed from the rear, and FIG. 7 shows the internal configuration of the laundry drying machine 1 viewed from the front.

Referring to FIGS. 5 to 7, the drum 200 of the laundry drying machine 1 can include a bearing 250.

The bearing 250 can be disposed between the drum body 210 and the front panel 111 of the cabinet 110 and between the drum body 210 and the rear panel 112 of the cabinet 100, respectively. The bearing 250 can be supported by the first support part 260 and the second support part 270 to be rotatable together with the drum body 210. Accordingly, it is possible to prevent the drum body 210 from being deformed by friction in direct contact with the first support part 260 and the second support part 270.

Referring to FIG. 5, the driving part 500 can include the drum motor 510, the pulley 520, and the belt 530 as described above.

The driving force generated by the drum motor 510 can be transmitted to the belt 530 through the pulley 520. The belt 530 is disposed on the outer circumferential surface of the drum body 210, is rotated by the pulley 520, and can rotate the drum body 210 together. In order to increase the transmission efficiency of the rotational force, the length of the belt 530 can be designed as a predetermined length in consideration of the radius of the drum body 210 and the distance connected to the pulley 520.

As described above, the laundry drying machine 1 can use a rotational driving method of the drum using the pulley 520. In some implementations, a separate configuration is not disposed at the rear of the drum 200, so the electrode part 400 can be disposed. Accordingly, disposing the components can be more convenient in designing.

The drum body 210 can be formed in a cylindrical shape with an open front and back, and it can be formed as a uniform surface that is not curved. In some examples, as shown in FIG. 5, the drum body 210 can be formed with an outer surface that protrudes after being drawn in a plurality of times to have a bellows shape.

In addition, the drum body 210 can include a portion drawn in more than a predetermined depth in order to prevent the belt 530 from being separated from the outer circumferential surface. In order to increase the rotational efficiency of the drum body 210, the arrangement portion of the drawn belt 530 can be formed in the center of the drum body 210 in the axial direction.

Referring to FIGS. 5 and 7, the drum 200 can include the electromagnetic shielding part 230 at a position coupled with the door part 120, a position coupled with the exhaust duct 310, and a position coupled with the supply duct 320, respectively.

As described above, the electromagnetic shielding part 230 is provided to prevent the electric field formed in the inner space of the drum 200 from leaking to the outside. To this end, the electromagnetic shielding part 230 can be formed of a conductive material to shield an electric field or an electromagnetic wave. Therefore, the inner space of the drum 200 is placed in a state surrounded by a conductor by the inner circumferential surface of the drum body 210 and the electromagnetic shielding part 230, and thus, electromagnetic shielding can be achieved.

In addition, for ventilation between the drum 200 and the outside, a plurality of fine holes can be disposed on the surface of the electromagnetic shielding part 230. The area and number of the holes can be determined in consideration of the material and thickness of the electromagnetic shielding part 230 that determines the electromagnetic shielding rate, the area of the inner space of the drum 200, and the frequency of the projected electromagnetic wave.

Referring to FIGS. 6 and 7, the air intake port 321 of the supply duct 320 can be formed toward the inner space of the cabinet 100.

More specifically, the supply duct 320 guides the air introduced through the air intake port 321 in the space between the drum 200 and the cabinet 100, and functions as a connection passage that discharges the air to the inner surface of the drum 200 through the discharge port 322.

However, depending on a design, the air intake port 321 can be formed in the external space of the cabinet 100. In this case, the air intake port 321 directly receives the external air of the laundry drying machine 1 and guides it to the drum 200 through the supply duct 320, and it can perform the function of a ventilation port 112a, which will be described later.

Referring to FIG. 3, the rear panel 112 of the cabinet 100 can further include an open ventilation port 112a.

The ventilation port 112a performs a function of ventilating the inner space and external space of the laundry drying machine 1. The air flow path of the laundry drying machine 1 including the internal air flow path of the laundry drying machine 1 described above, is formed so that the air introduced into the inner space of the laundry drying machine 1 through the ventilation port 112a passes through the supply duct 320, and then is introduced into the drum 200, and then is discharged to the outside through the exhaust duct 310.

Air is continuously introduced into the inner space of the drum 200 by the supply duct 320, and a negative pressure is formed in the space between the cabinet 100 and the drum 200. Accordingly, the inside of the cabinet 100 has a pressure lower than atmospheric pressure, and external air can be introduced into the laundry drying machine 1 through the ventilation port 112a due to the pressure difference.

The ventilation port 112a can be disposed adjacent to the driving part 500. Among the components of the driving part 500, in particular, the drum motor 510 can generate heat during a rotational cycle. In this case, the ventilation port 112a is disposed in a position close to the drum motor 510 of the rear panel 112, and it can perform an air-cooling function to reduce the heat generated by the drum motor 510 by introducing external air.

Referring to FIGS. 5 and 7, the exhaust duct 310 is connected to the front lower portion of the drum body 210 at the top end, and it can be formed in a streamlined shape in which a width becomes narrower as it extends downward.

More specifically, the exhaust duct 310 can include a duct body 311, an intake fan 312, an exhaust pipe 313, and an exhaust port 314. The duct body 311 is formed with a wide upper end so that air can smoothly flow into the inner space of the drum body 210, and it can be connected to the intake fan 312 as the width becomes narrower toward the lower portion.

The detailed configurations of the exhaust duct 310 can be arranged in various ways according to a design in consideration of the area of the lower space of the drum 200 and the arrangement of detailed configurations of the driving part 500.

The air introduced into the intake fan 312 is introduced into the exhaust pipe 313. Referring to FIGS. 3 and 5, the intake fan 312 can be disposed to be deviated from the center in any one of the left and right directions. When the intake fan 312 is vertically disposed in the duct body 311, the size of the laundry drying machine 1 can be extended vertically, so it is designed to minimize the volume. Therefore, it can be disposed at the rear of the duct body 311 in consideration of the size of the intake fan 312.

The exhaust pipe 313 can be formed at a position more centrally moved from the intake fan 312. The position of the exhaust pipe 313 can be disposed between one side on which the driving part 500 is disposed and the side other than the opposite side on which the supply duct 320 is disposed. Therefore, the internal flow path of the exhaust duct 310 is not arranged on a straight line with respect to the left and right sides, but it can be formed by being bent to the side one or more times by the spaced-apart arrangement of the duct body 311, the intake fan 312, and the exhaust pipe 313 to the left and right.

One side of the exhaust pipe 313 is connected to the intake fan 312 and the other side is connected to the exhaust port 314. The exhaust port 314 performs the exit function of the internal flow path of the laundry drying machine 1 described above. The exhaust port 314 can be disposed at the center of the lower end of the rear panel 112 according to a design. Accordingly, the air is introduced into the laundry drying machine 1 through the ventilation port 112*a* and then discharged through the exhaust port 314.

Hereinafter, various implementations of the laundry drying machine 1 will be described with reference to FIGS. 8 to 13.

Figure 9:
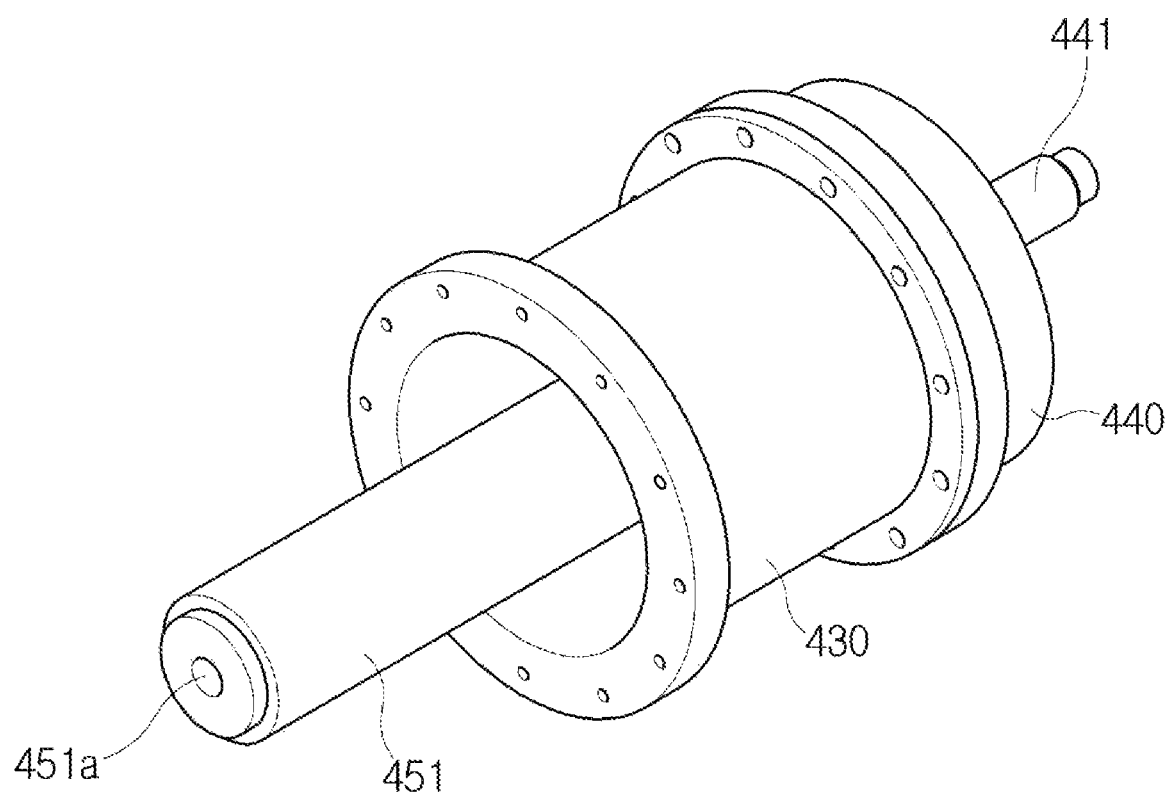
FIGS. 9 to 11 are a perspective view and a cross-sectional view illustrating an example of an electrode part.
Figure 10:
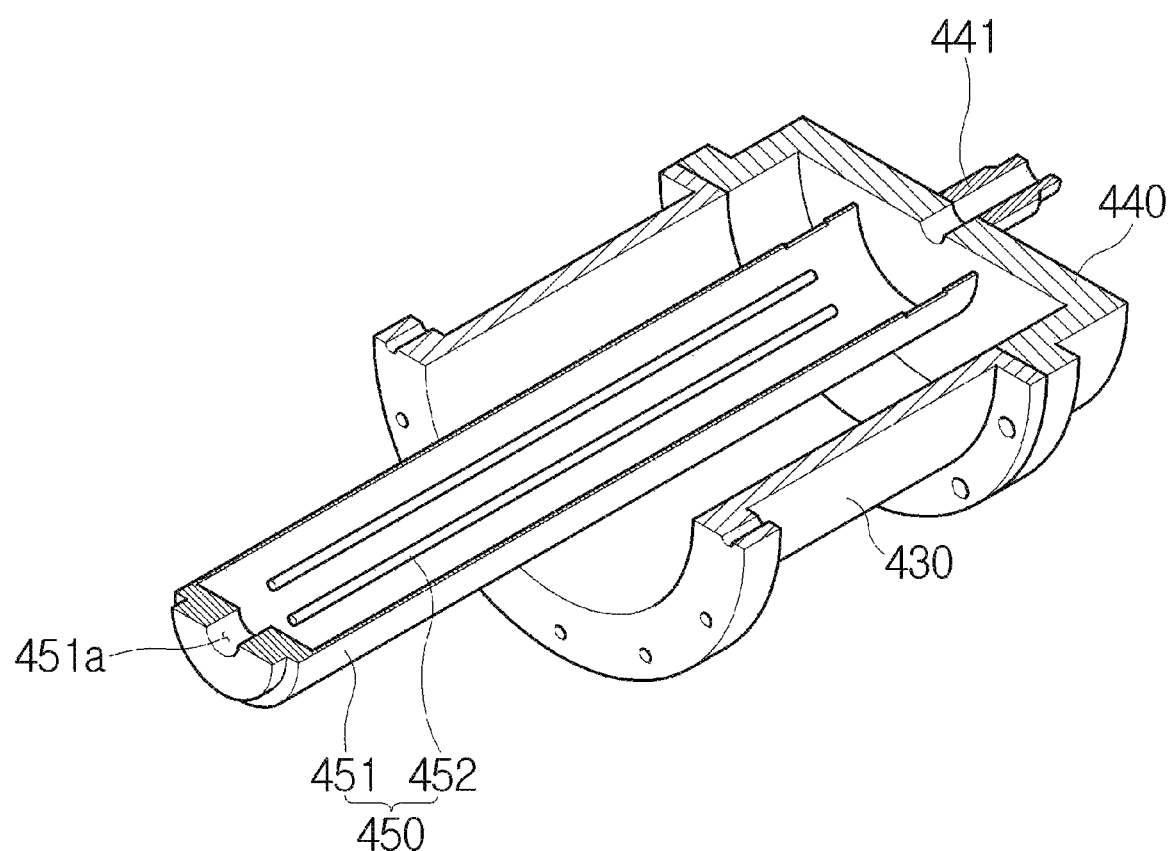
Figure 11:
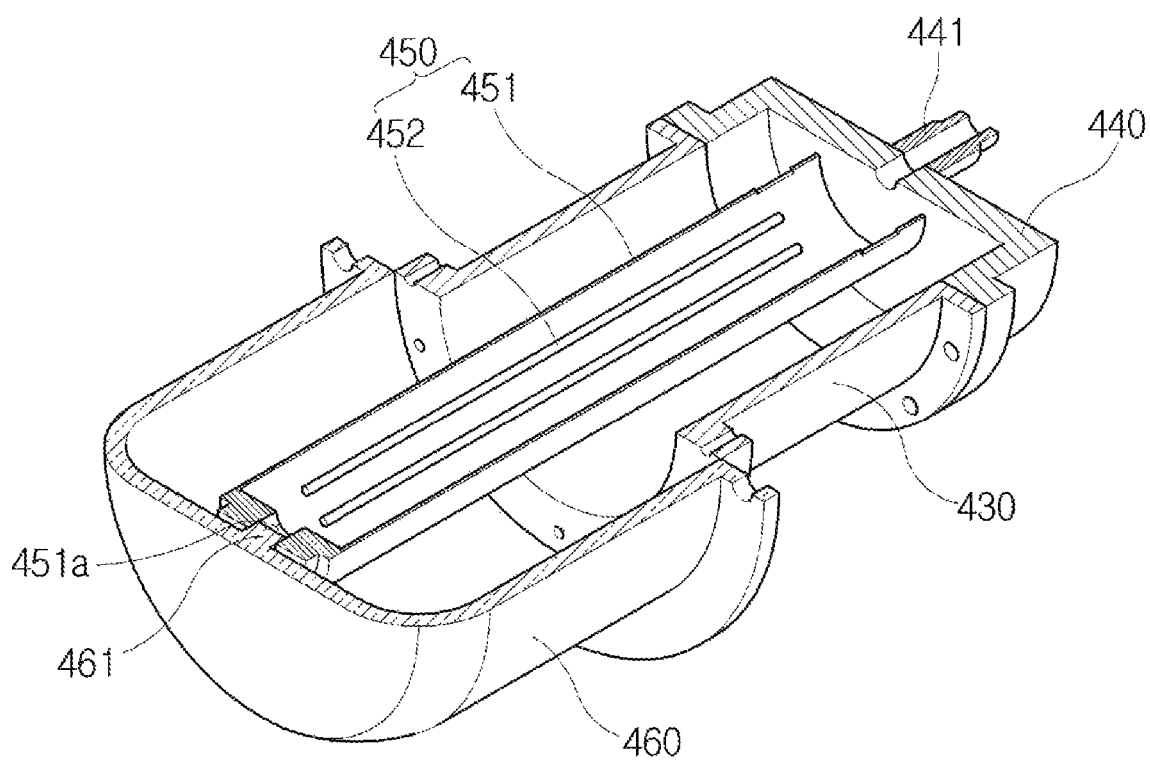

FIG. 8 shows a partial perspective view of an example of the laundry drying machine 1, and FIGS. 9 to 11 show a perspective view and a cross-sectional view of the configuration of the electrode parts 400 of the laundry drying machine 1.

Referring to FIGS. 8 to 11, the electrode part 400 of the laundry drying machine 1 can include the oscillator 410, the probe housing 430, the connector 440, the probe 450, and the probe cover 460.

The functions and shapes of the oscillator 410, the probe housing 430, the probe 450, and the probe cover 460 can be commonly used with those described above with reference to FIG. 2, so hereinafter the parts having differences will be described in detail.

One side of the connector 440 is connected to the probe housing 430 and the other side is connected to the oscillator 410. The connector 440 can be formed in a disk shape extending by a predetermined length in a radial direction so that one side corresponds to the end of the probe housing 430 (see FIG. 10). The connector 440 and the probe housing 430 can include a plurality of holes corresponding to each other in the disk-shaped cross-section in contact with each other. Therefore, in order to increase the coupling force, a coupling member such as a bolt or a pin can be inserted into the corresponding holes and coupled thereto.

A shape of a portion of the connector 440 connected to the oscillator 410 can be formed as a hollow jack 441. A plug of the oscillator 410 can be inserted into and coupled to the jack 441 of the connector 440. However, the present disclosure is not limited thereto, and as described above, various configurations commonly used in the industry can be selected and used for the oscillator 410, and the shape of the connector 440 can be changed in response to the selected shape of the oscillator 410.

The jack 441 of the connector 440 can be disposed on a central axis on the outer surface of the connector 440. Through this, the plug of the oscillator 410 can be inserted into the central axis of the connector 440. Accordingly, in some implementations, the plug of the oscillator 410 shares a central axis with the connector 440 of the electrode part 400, the probe housing 430, the probe 450, and the probe cover 460. Furthermore, since the electrode part 400 is disposed on the central axis of the drum body 210, the plug of the oscillator 410 can be disposed on the central axis of the drum body 210.

Referring to FIG. 10, the probe body 451 can be contact and connected to an inner surface of the connector 440. When an empty space exists between the inner surface of the connector 440 and one side of the probe body 451, the electromagnetic wave propagating from the oscillator 410 vibrates and can flow out of the probe body 451, and the radiation efficiency of RF electromagnetic waves can decrease in the inner space of the drum 200. To prevent this, the probe body 451 can be in close contact with the inner surface of the connector 440.

Referring to FIGS. 8 to 11, the probe body 451 can further include a fixing hole 451*a* formed with a predetermined radius at one end protruding from the inner space of the drum 200. The fixing hole 451*a* can be disposed on the central axis of the probe body 451. The inner space of the probe body 451 can be opened to the outside through the fixing hole 451*a*.

The probe cover 460 can further include a fixing pin 461 formed to protrude to the inner surface. The probe body 451 and the probe cover 460 can be coupled and fixed by inserting the fixing pin 461 into the fixing hole 451*a*. The fixing pin 461 can be disposed on the central axis of the probe body 451 and the probe cover 460 to be inserted into the fixing hole 451*a*.

One side of the probe body 451 can be fixed to the probe cover 460, and the other side can be in close contact with the inner surface of the connector 440 so that the position thereof can be fixed. In order to fix the position of the probe body 451 without a separate support member, the length of the probe body 451 can be formed corresponding to the sum of the height of the probe cover 460, the axial length of the probe housing 430, and the axial length of the connector 440.

The probe 450 can further include an electrode pin 452. Referring to FIG. 2, the electrode pin 452 can be disposed on the central axis of the probe 450. More specifically, the electrode pin 452 can be inserted into and fixed to the fixing hole 451*a* of the probe body 451.

Referring to FIG. 11, the probe 450 can include a plurality of electrode pins 452. The electrode pins 452 are provided to increase the output efficiency of the RF electromagnetic wave of the probe 450, and the plurality of electrode pins 452 can be disposed along the inner circumferential surface of the probe body 451 with a predetermined radius therebetween. In order to fix the position of the electrode pin 452, a plurality of grooves can be formed in the inner circumferential surface of the probe body 451 to correspond to the shape of the electrode pin 452 so that the electrode pines are inserted and fixed.

Alternatively, a pin fixing member 453 capable of fixing a position after the electrode pin 452 is disposed can be further included. The pin fixing member 453 can be formed in a curved disk shape to fix the electrode pin 452. As for the shape of the pin fixing member 453, various shapes capable of fixing the electrode pin 452 can be selected.

In some implementations, the resonance region can be extended. For example, the resonance frequency band by radiating the RF electromagnetic wave generated by the oscillator 410 can extend into the inner space of the drum 200 through the probe 450. This has the effect of improving drying efficiency in view of the characteristic of the present disclosure in which a subject to be dried is dried by a dielectric heating method for applying an electric field to a dielectric material.

In some examples, the RF electromagnetic wave generated from the oscillator 410 can be directly transmitted to the probe 450 through the connector 440, where the high-power RF electromagnetic wave may not be transmitted. The high-power RF electromagnetic wave includes an RF electromagnetic wave having an output of 1 kW or more. In the case of RF electromagnetic wave transmission, in some examples, a significant loss may not occur in the case of RF electromagnetic waves having an output of 1 kW or less.

Typically, the drying target, i.e., the subject to be dried of the laundry drying machine 1 is clothes, and a high-power RF electromagnetic wave of 2 kW or more may be provided to evaporate the moisture contained in the clothes by applying an electric field to the clothes. In some cases, when the high-power RF electromagnetic wave of 1 kW or more is transmitted from the oscillator 410 to the probe 450 through the connector 440, electromagnetic wave loss may occur. Therefore, in the drying cycle for drying the subject to be dried, the power efficiency of the laundry drying machine 1 may be lowered.

In some implementations, the guide 420 can be capable of transmitting the high-power RF electromagnetic wave of 1 kW or more with a minimized loss.

FIG. 12 shows a partial perspective view of an example of the laundry drying machine 1.

In some implementations, referring to FIG. 12, the electrode part 400 can include the oscillator 410 and the guide 420.

More specifically, the guide 420 can include the guide connection part 423 formed on one side, and the oscillator 410 can be coupled to the guide connection part 423. An open connection hole 424 is provided at the other side of the guide 420, and can be connected to the coupling hole 220 formed on the rear surface of the drum 200.

The guide 420 can be formed of a hollow conductive waveguide capable of minimizing the loss of high-power electromagnetic wave.

In consideration of propagation efficiency and design, the guide 420 can be formed of a rectangular waveguide having a rectangular cross-section and extending in one direction, among the waveguides.

For example, the waveguides can include a parallel-plate waveguide, a rectangular waveguide, a circular waveguide, a dielectric waveguide, an optical fiber, and the like. In some examples, the guide 420 can be disposed in the outer space of the cabinet 100 of the laundry drying machine 1, where one side of the guide 420 can be connected to other components such as the probe housing 430. In consideration of these design characteristics, the rectangular waveguide having one side of a flat plate can be selected.

Accordingly, the RF electromagnetic wave generated by the oscillator 410 can propagate in the inner space of the guide 420 and be radiated into the inner space of the drum 200 through the coupling hole 220.

In some implementations, where the RF electromagnetic wave is transmitted through the guide 420, the oscillator 410 can output the high-power electromagnetic wave having power that is greater than or equal to 1 kW. Considering the material of the subject to be dried, that is, clothing, there is a concern that damage or deformation can occur when the electromagnetic wave of 3 kW or more is radiated. Thus, the maximum output of the oscillator 410 can be set to 3 kW. In some examples, the maximum output of the oscillator 410 can be set to 2.5 kW or less.

In some examples, when the RF electromagnetic wave is radiated into the inner space of the drum 200, the resonance point can be changed while the subject to be dried moves by the rotation of the drum 200.

In the present disclosure in which a subject to be dried is dried by the dielectric heating method for applying an electric field to a dielectric material, the heating and drying efficiency of the subject to be dried is the highest at the frequency of the resonance point or resonance area. Therefore, when the resonance point is changed by the change of the position of the subject to be dried, the drying efficiency may be lowered by the application of the electric field of the same frequency.

In some cases, a configuration of a matcher or a tuner for matching the electromagnetic wave to the resonance region can be added. In some cases, a bulky matcher or a tuner is added in order to radiate the high-power RF electromagnetic wave, design and aesthetics may be affected. In addition, when a heavy matcher or tuner is disposed between the oscillator 410 and the guide 420, the guide 420 may not withstand the weight and be deformed.

In some implementations, the probe 450 can serve as an antenna to widen the resonance region.

Figure 13:
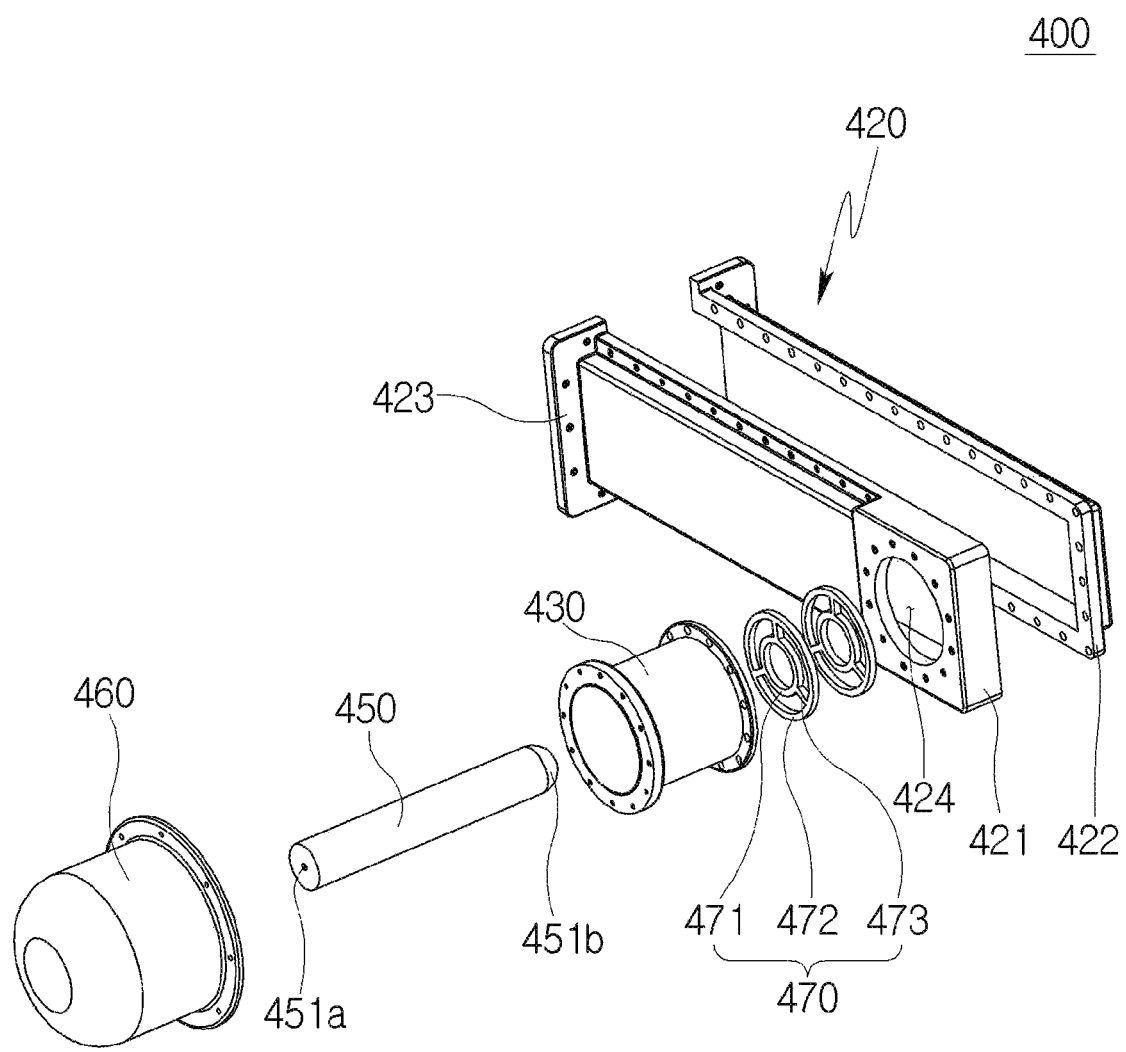
FIG. 13 is an exploded perspective view showing example components of an electrode part.

FIG. 13 shows an exploded perspective view of the electrode part 400 of the laundry drying machine 1.

In some implementations, the electrode part 400 can include the guide 420 and the probe 450.

More specifically, first, the resonance frequency band can be extended by radiating the RF electromagnetic wave through the probe 450 protruding into the inner space of the drum 200, and second, the high-power RF electromagnetic wave generated by the oscillator 410 is transmitted to the probe 450 through the guide 420 that functions as a waveguide, so that the transmission loss can be minimized.

The guide 420 can include a first guide panel 421, a second guide panel 422, the guide connection part 423, and the connection hole 424.

As described above, the guide 420 can be formed of the rectangular waveguide having a rectangular cross section and extending in one direction, among the waveguides.

The first guide panel 421 and the second guide panel 422 can be combined to form an internal space having the rectangular cross section, that is, a connection path for electromagnetic wave.

The circular connection hole 424 can be disposed on one side of the first guide panel 421 connected to the probe housing 430. The shape of the connection hole 424 can be formed in a shape other than a circular shape to correspond to the shape of the connected component.

The probe 450 can be inserted into the connection hole 424 of the guide 420, and a portion of the probe 450 can be disposed in the inner space of the guide 420. Accordingly, the electromagnetic wave propagating from the oscillator 410 while vibrating in the inner space of the guide 420 can be directly transmitted to the probe 450.

The probe 450 can be disposed coaxially with the central axis of the connection hole 424 of the guide 420. Through this, the propagation efficiency of the electromagnetic wave transmitted from the guide 420 can be improved.

In addition, an incident surface 451b can be provided on one side of the probe 450 disposed in the inner space of the guide 420. The incident surface 451b can be formed in a hemispherical shape. The electromagnetic wave that vibrates irregularly in the inner space of the guide 420 can be incident at various angles. The incident surface 451b is formed in a hemispherical shape to efficiently absorb the electromagnetic wave, and furthermore, it is possible to improve the transmission efficiency of the electromagnetic wave.

The guide connection part 423 is a part to which a separate component from the guide 420, such as the oscillator 410 or a matcher or tuner, can be connected. The guide connection part 423 can be formed to have a predetermined width or more in consideration of the coupling support force, and it can be formed in various shapes to correspond to the shape of the connected component.

The electrode part 400 is disposed between the probe housing 430 and the probe 450 to fix the position of the probe 450 on the central axis and a probe support member 470 that supports the probe 450 to prevent it from falling off can be further included.

The probe support member 470 can be formed in the shape of a hollow disk such that the outer circumferential surface of the probe support member 470 is supported in contact with the inner circumferential surface of the probe housing 430, and the inner circumferential surface of the probe support member 470 has an open space corresponding to the radius of the probe 450 so as to contact and support the outer circumferential surface of the probe 450.

The probe support member 470 can be press-fitted between the probe housing 430 and the probe 450 to guide the position of the probe 450. To this end, the outer diameter of the probe support member 470 can be equal to or greater than the inner diameter of the probe housing 430, and the inner diameter of the probe support member 470 can be formed to be equal to or smaller than the outer diameter of the probe 450.

According to the implementation of FIG. 13, the probe support member 470 can include an inner ring 471, an outer ring 472, and a support rib 473.

Specifically, the inner ring 471 can be formed so as to be fitted and coupled to the outer circumferential surface of the probe 450, and the outer ring 472 can be formed to correspond to being fitted and coupled to the inner circumferential surface of the probe housing 430. The support rib 473 can be formed between the inner ring 471 and the outer ring 472 to connect them.

Referring to FIG. 13, at least two support ribs 473 can be provided between the inner ring 471 and the outer ring 472 to prevent the probe 450 from moving. In order to prevent the movement due to impacts in the vertical and horizontal directions, the support ribs 473 are disposed to have an angle of 120° to each other to support the probe 450 at three points. In some implementations, where two or more support ribs 473 are provided, they can be arranged to have a constant distance from each other in the circumferential direction in order to improve the support force of the probe 450.

At least two probe support members 470 can be disposed to prevent inclination of the probe 450 extending in the axial direction. Accordingly, the probe 450 is supported at one point, and it is possible to prevent an axial movement in the form of a cantilever from occurring.

Although the present disclosure has been described in detail through specific implementations, it is intended to describe the present disclosure in detail, and the present disclosure is not limited thereto. It is apparent that the present disclosure can be modified or improved by those skilled in the art within the technical spirit of the present disclosure.

All simple modifications or changes of the present disclosure fall within the scope of the present disclosure, and the specific scope of protection of the present disclosure will be made apparent by the appended claims.

What is claimed is:

1. A laundry drying machine, comprising:
   a cabinet;
   a drum that is rotatably disposed inside the cabinet and that defines an inner space configured to accommodate a subject to be dried;
   a driver configured to rotate the drum;
   a duct configured to supply air to the drum and to discharge the air from the drum; and
   an electrode part configured to form an electric field in the inner space of the drum to thereby heat the subject, the electrode part comprising a probe configured to radiate an electromagnetic wave defining the electric field,
   wherein at least a portion of the probe is disposed in the inner space of the drum, and
   wherein the probe comprises:
      a probe body that defines a probe space therein, wherein at least a portion of a first side of the probe body is closed, and
      a plurality of electrode pins that are disposed at an inner circumferential surface of the probe body and spaced apart from one another by a predetermined angle along a circumferential direction of the probe body.

2. The laundry drying machine according to claim 1, wherein the probe has a cylindrical shape and is disposed along a central axis of the drum.

3. The laundry drying machine according to claim 1, wherein the drum defines a coupling hole that receives at least a portion of the electrode part,
   wherein the electrode part further comprises:
      an oscillator configured to generate the electromagnetic wave;
      a probe housing that is coupled to an outer circumferential surface of the coupling hole; and
      a connector configured to transmit the electromagnetic wave from the oscillator to the probe, the connector having a first side connected to the probe housing and a second side connected to the oscillator, and
   wherein the probe is configured to receive the electromagnetic wave from the connector.

4. The laundry drying machine according to claim 3, wherein the oscillator is configured to output the electromagnetic wave having power that is less than or equal to 1 kW.

5. The laundry drying machine according to claim 1, wherein the plurality of electrode pins are disposed in the probe space of the probe body.

6. The laundry drying machine according to claim 1, wherein the probe body further defines a fixing hole at the first side of the probe body, and
   wherein the plurality of electrode pins are respectively fixed to a plurality of grooves that are defined at the inner circumferential surface of the probe body.

7. The laundry drying machine according to claim 1, wherein the electrode part further comprises a probe cover that is disposed at a rear inner surface of the drum and has a cylindrical shape, the probe cover having a closed surface and an open surface that face each other.

8. The laundry drying machine according to claim 7, wherein the probe cover comprises a fixing pin that protrudes from a center of the closed surface toward the open surface,
   wherein the probe body further defines a fixing hole at the first side of the probe body, the fixing hole receiving the fixing pin, and wherein the probe cover and the probe body are coaxially connected to each other by coupling of the fixing pin and the fixing hole.

9. A laundry drying machine, comprising:
a cabinet;
a drum that is rotatably disposed inside the cabinet and defines an inner space configured to accommodate a subject to be dried, the drum further defining a coupling hole;
a driver configured to rotate the drum;
a duct configured to supply air to the drum and to discharge the air from the drum; and
an electrode part configured to form an electric field in the inner space of the drum to thereby heat the subject, the electrode part comprising:
   an oscillator configured to generate an electromagnetic wave defining the electric field,
   a probe disposed in the inner space of the drum through the coupling hole and configured to radiate the electromagnetic wave,
   a probe housing connected to the coupling hole from an outside of the drum, and
   a guide that defines a hollow waveguide configured to transmit the electromagnetic wave from the oscillator to the probe, the guide having a first side connected to the probe housing and a second side connected to the oscillator.

10. The laundry drying machine according to claim 9, wherein the oscillator is configured to output the electromagnetic wave having power that is greater than or equal to 1 kW and less than or equal to 2.5 kW.

11. The laundry drying machine according to claim 9, wherein the guide has a rectangular cross section and extends in one direction with respect to with respect to a rotation axis of the drum.

12. The laundry drying machine according to claim 9, wherein the guide extends in a left direction or a right direction with respect to a rotation axis of the drum.

13. The laundry drying machine according to claim 9, wherein the guide defines a connection hole at the first side of the guide, the connection hole having a circular shape.

14. The laundry drying machine according to claim 13, wherein the probe is disposed on an axis of the connection hole, and
   wherein at least a portion of the probe is disposed in an inner space of the guide.

15. The laundry drying machine according to claim 14, wherein the probe has an incident surface that has a hemispherical shape protruding toward the connection hole.

16. The laundry drying machine according to claim 9, wherein the electrode part further comprises a probe support member that is disposed between the probe housing and the probe and fixes a position of the probe in the probe housing.

17. The laundry drying machine according to claim 16, wherein the probe support member comprises:
   an inner ring coupled to an outer circumferential surface of the probe;
   an outer ring coupled to an inner circumferential surface of the probe housing; and
   a plurality of support ribs that connect the inner ring to the outer ring and are arranged at regular intervals along a circumferential direction of the inner ring or the outer ring.

18. The laundry drying machine according to claim 9, wherein the electrode part further comprises a plurality of probe support members that are disposed between the probe housing and the probe and fix a position of the probe in the probe housing, the plurality of probe support members being spaced apart from one another in an axial direction of the probe.

19. The laundry drying machine according to claim 9, wherein the oscillator is disposed at one side with respect to a rotational axis of the drum and spaced apart from the rotational axis of the drum by a predetermined distance.

20. A laundry drying machine, comprising:
a cabinet;
a drum that is rotatably disposed inside the cabinet and that defines an inner space configured to accommodate a subject to be dried;
a driver configured to rotate the drum;
a duct configured to supply air to the drum and to discharge the air from the drum; and
an electrode part configured to form an electric field in the inner space of the drum to thereby heat the subject, the electrode part comprising a probe configured to radiate an electromagnetic wave defining the electric field,
wherein at least a portion of the probe is disposed in the inner space of the drum, and
wherein the probe comprises:
   a probe body that defines a probe space therein, wherein at least a portion of a first side of the probe body is closed, and the probe body further defines a fixing hole at the first side of the probe body, and
   an electrode pin that is disposed in the probe space of the probe body, wherein the electrode pin is coupled to the fixing hole and fixed to the probe space of the probe body.

* * * * *